(12) United States Patent
Gross et al.

(10) Patent No.: US 7,546,515 B2
(45) Date of Patent: *Jun. 9, 2009

(54) METHOD OF STORING DOWNLOADABLE FIRMWARE ON BULK MEDIA

(75) Inventors: Stephen J. Gross, Cupertino, CA (US); Bryan John Mee, San Jose, CA (US)

(73) Assignee: SanDisk Corporation, Milpitas, CA (US)

( * ) Notice: Subject to any disclaimer, the term of this patent is extended or adjusted under 35 U.S.C. 154(b) by 489 days.

This patent is subject to a terminal disclaimer.

(21) Appl. No.: 11/319,254

(22) Filed: Dec. 27, 2005

(65) Prior Publication Data

US 2007/0150790 A1 Jun. 28, 2007

(51) Int. Cl.
*G11C 29/00* (2006.01)

(52) U.S. Cl. ..................................... 714/763
(58) Field of Classification Search .................. 714/763
See application file for complete search history.

(56) References Cited

U.S. PATENT DOCUMENTS

| | | | |
|---|---|---|---|
| 4,277,844 A | 7/1981 | Hancock et al. | ............. 714/755 |
| 5,043,940 A | 8/1991 | Harari | |
| 5,172,338 A | 12/1992 | Mehrotra et al. | |
| 5,532,962 A | 7/1996 | Auclair et al. | |
| 5,680,579 A | 10/1997 | Young et al. | |
| 5,708,667 A | 1/1998 | Hayashi | |
| 5,712,180 A | 1/1998 | Guterman et al. | ............. 437/43 |
| 5,909,449 A | 6/1999 | So et al. | |
| 6,046,935 A | 4/2000 | Takeuchi et al. | |
| 6,098,132 A | 8/2000 | Olarig et al. | |
| 6,216,251 B1 | 4/2001 | McGinn | |
| 6,223,301 B1 | 4/2001 | Santeler et al. | |
| 6,260,156 B1 * | 7/2001 | Garvin et al. | .................. 714/8 |
| 6,404,647 B1 | 6/2002 | Minne | |

(Continued)

FOREIGN PATENT DOCUMENTS

EP 1545012 6/2005

OTHER PUBLICATIONS

U.S. Appl. No. 11/016,285, filed Dec. 16, 2004, Bennett et al.

(Continued)

*Primary Examiner*—Esaw T Abraham
*Assistant Examiner*—Sam Rizk
(74) *Attorney, Agent, or Firm*—Weaver Austin Villeneuve Sampson LLP

(57) ABSTRACT

A portion of data stored in a non-volatile memory may be found to be corrupted when it is read. Where parity data is generated from portions of data and the parity data is stored with the portions of data, the corrupted data may be reconstructed from the parity data and uncorrupted portions of data.

29 Claims, 13 Drawing Sheets

U.S. PATENT DOCUMENTS

| | | |
|---|---|---|
| 6,678,192 B2 | 1/2004 | Gongwer et al. |
| 6,751,766 B2 | 6/2004 | Guterman et al. |
| 6,757,862 B1 * | 6/2004 | Marianetti, II ............... 714/774 |
| 6,763,424 B2 | 7/2004 | Conley ....................... 711/103 |
| 6,829,167 B2 | 12/2004 | Tu et al. |
| 6,831,865 B2 | 12/2004 | Chang et al. |
| 6,883,131 B2 | 4/2005 | Acton |
| 2002/0174403 A1 | 11/2002 | Chethik ...................... 714/804 |
| 2003/0061558 A1 | 3/2003 | Fackenthal et al. .......... 714/755 |
| 2005/0144363 A1 | 6/2005 | Sinclair ....................... 711/103 |
| 2005/0144516 A1 | 6/2005 | Gonzalez et al. |
| 2005/0172065 A1 * | 8/2005 | Keays ......................... 711/103 |
| 2006/0156190 A1 * | 7/2006 | Finkelstein et al. ......... 714/763 |
| 2007/0089033 A1 * | 4/2007 | Zeevi .......................... 714/763 |
| 2007/0150791 A1 | 6/2007 | Gross et al. .................. 714/763 |

OTHER PUBLICATIONS

ISA/EPO, "Notification of Transmittal of the International Search Report and the Written Opinion of the International Searching Authority, or the Declaration," mailed on Nov. 19, 2007 in corresponding Int'l. App. No. PCT/US2006/062255, 14 pages.

USPTO Office Action dated Aug. 29, 2008 in U.S. Appl. No. 11/319,888.

* cited by examiner

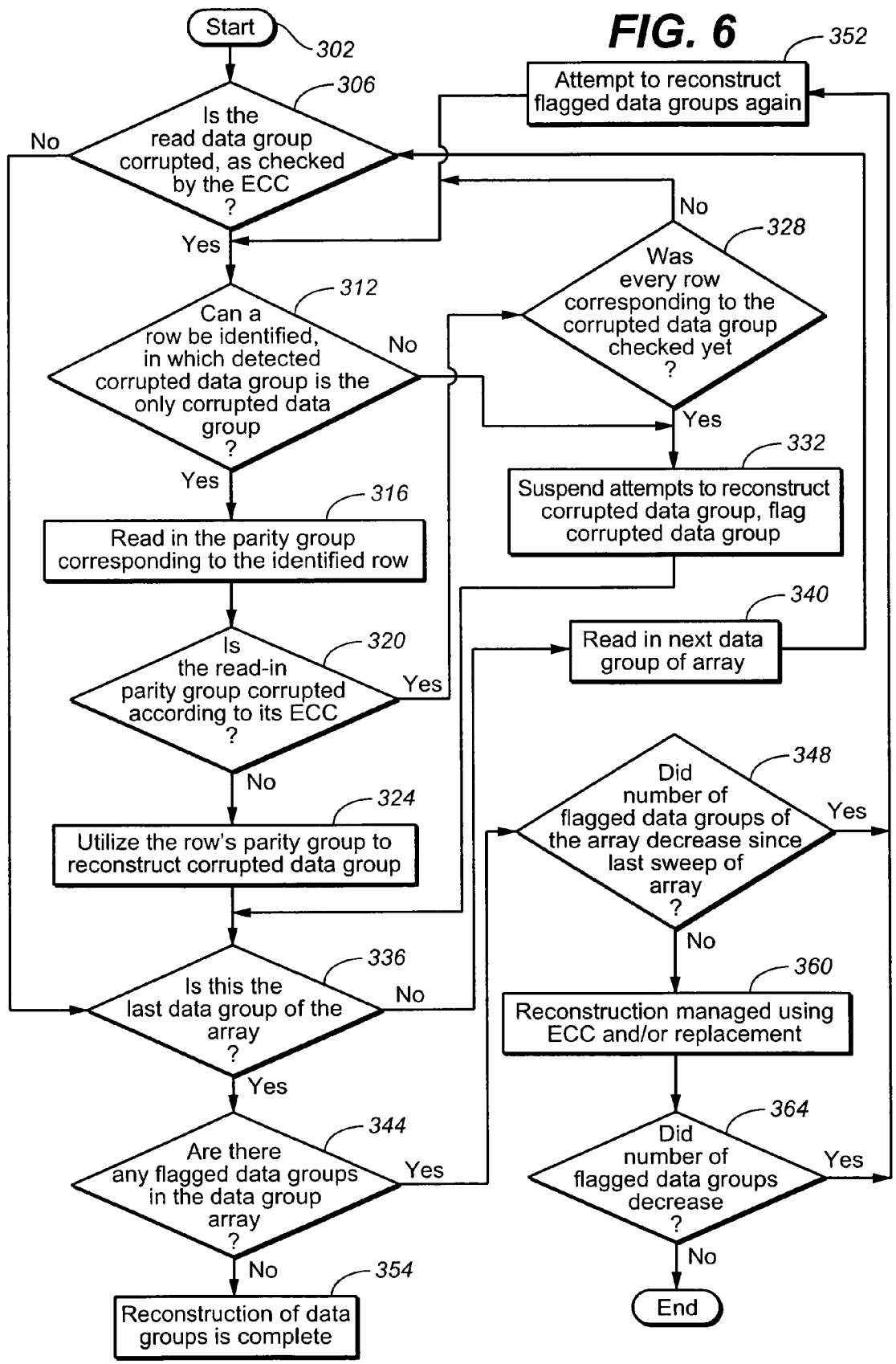

METHOD OF STORING DOWNLOADABLE FIRMWARE ON BULK MEDIA

CROSS REFERENCE TO RELATED APPLICATION

This application is related to an application being filed concurrently herewith by Stephen J. Gross et al., entitled "Storing Downloadable Firmware on Bulk Media" application Ser. No. 11/319,888, now published as Application Publication No. 20070150791, which application is incorporated herein in its entirety by this reference.

BACKGROUND

1. Field of Invention

The invention relates to non-volatile memory systems, more precisely, to a fast method of correcting corrupted data in non-volatile memory systems by using parity bits.

2. Description of Related Art

Memory systems are an integral part of most modern electronic equipment and devices. With the continued scaling down of the size of memory systems, data corruption remains a considerable design problem. In many architectures the detection and reconstruction of corrupted data is performed by error correction codes (ECCs). ECCs are remarkably efficient at reconstructing data. However, utilizing an ECC can be time consuming, as it often involves performing extensive computation. In cases of clustered errors, an ECC may be incapable of performing correction at all.

Therefore, in some multiple component memory systems a simpler and faster method of the reconstruction of corrupted data is practiced, which involves parity bits. This method is practiced, for example, in some disc drives, containing multiple discs. A variant of the method is referred to as Redundant Array Independent Discs, or RAID.

In RAID and related methods the data are organized into data groups. These data groups are then physically stored on different discs. Subsequently, parity bits are associated with the corresponding elements of the data groups on different discs. These parity bits can then be utilized for reconstructing the data, if the data got corrupted.

However, the aspect of the RAID design that the data are physically divided into data groups and then the data groups are stored separately may introduce too stringent design restrictions, possibly slowing down the memory system.

Non-volatile memory systems are being used in an ever-increasing number of applications and devices. These include flash memories, used, among others, in digital cameras and mobile communication equipment. In these non-volatile memories the reading of the data can be quite slow, limiting their applicability, usefulness, and competitiveness with other memory systems, such as RAMs and DRAMs. The data can be user data, such as a file representing a photo. Or the data can be firmware, that is, software used for the operation of the device. Firmware is typically read in when the device is switched on. Accelerating the reading of the firmware reduces the overall time of switching on the device, improving its usefulness and competitiveness.

Therefore, there is a need for fast methods for reconstructing corrupted data in non-volatile memory systems, where the method does not necessarily require the physical organization and separation of data groups.

SUMMARY

Briefly and generally, parity bits are generated and used in an efficient method of managing corrupted data. According to one aspect of the invention, the method includes organizing data in a non-volatile memory system logically in a multidimensional data group array. In particular, the data are organized logically into data groups, and the data groups are organized logically into data group rows, which belong to the multidimensional data group array. In some embodiments data groups include vectors and various matrices. In some embodiments the multidimensional data group array includes various matrices of the data groups. Logically organized data and data groups are not necessarily organized in a physical sense. Logically organized data and data groups are only indexed according to the organization scheme.

The method further includes generating parity bit groups, which correspond to the data group rows. The parity bit groups include parity bits. The parity bits can be generated by performing logical operations on corresponding items of data of the data groups along the data group rows. These logical operations can include summation and the exclusive or operation.

The method further includes associating logically the generated parity bit groups with the corresponding data group rows. Also, a parity group of parity groups can be formed.

According to another aspect of the invention, a method of managing corrupted data is provided, where the data is organized into a data group array and has parity bit groups associated with the rows of the data group array. The method includes using an error correction code to identify corrupted data groups within the data group array and subsequently using the parity bit groups to manage the corrupted data groups.

The advantages of the method include the utilization of parity bits to reconstruct corrupted data in non-volatile memory systems. Further advantages include that reconstructing corrupted data by using parity bits can be considerably faster than by using error correction codes. Also, the method organizes the data into data group arrays only logically. Therefore, the data can be organized physically in a different manner, motivated by some advantageous architectural reason. The method can be advantageously applied to the firmware of non-volatile memory systems.

In some aspects of the invention an error correction code is used to identify corrupted data groups as part of a read-in process. When a corrupted data group is identified, data group rows are searched for, in which the corrupted data group is the only corrupted data group. If such a data group row is identified, then the parity group of the data group row is read in as well, and used for reconstructing the corrupted data group. The reconstruction includes performing logical operations on the corresponding items of data of the non-corrupted data groups of the data group row and the parity group of the data group row.

If no data group row is identified where the corrupted data group is the only corrupted data group, then the corrupted data group is flagged and further corrupted data groups are searched for reconstruction. Once the reconstruction of substantially all the data groups of the data group array has been attempted, the method returns to attempt the reconstruction of the flagged corrupted data groups again.

Corrupted data groups, which could not be reconstructed even by repeated attempts, are managed by additional methods. These additional methods include using error correction codes to reconstruct the corrupted data groups, or replacing the corrupted data groups by another replica or corresponding data group, or simply discarding the corrupted data group.

In some aspects of the invention the read-in parity groups are also checked for corruption. If corrupted parity groups are identified, then either additional parity groups can be searched for, or the reconstruction of the corrupted parity group can be attempted utilizing the parity group of parity groups.

In some examples, a sector of data has ECC bits that are stored as part of the sector. A sector may be treated as a data group so that a parity group (parity sector) is generated from multiple sectors. In other examples, a data group may contain more than one sector.

In some examples, correction of a corrupted data group or parity group is first attempted using ECC. In such examples, reconstruction using data groups and parity groups is only attempted if correction using ECC fails.

In one embodiment, a parity sector is generated from the data sectors of a single page. The parity sector may be stored in the page or elsewhere, for example, in a block that is dedicated for storage of parity sectors. Stored parity sectors may be used to reconstruct corrupted sectors. For example, when additional sectors are written to a page that contains stored sectors, the stored sectors may become corrupted. Such corrupted sectors may be reconstructed from uncorrupted sectors and a parity sector. Where sectors are stored in metapages, parity sectors may be generated for the sectors of a metapage and stored in the metapage or elsewhere.

BRIEF DESCRIPTION OF THE DRAWINGS

FIG. 6 illustrates the steps of a method of using parity bits to manage corrupted data in some detail.

DETAILED DESCRIPTION

According to aspects of the invention, a method of data storage and a fast method of data reconstruction in non-volatile memory systems are presented. Non-volatile memory systems are described, for example, in U.S. Pat. No. 5,712,180, granted to D. Guterman et al., hereby incorporated by reference in its entirety. Such methods typically include the step of generating and storing supplementary information as part of the loading of the memory system, and the subsequent step of reconstructing the data utilizing the stored supplementary information, as part of the reading out from the memory system.

In one embodiment of the invention the supplementary information includes parity bits. Utilizing parity bits for reconstructing data speeds up the reconstruction procedures in some non-volatile memory systems. The method can be practiced in non-volatile memory systems such as in flash memories. More generally, the method can be practiced in single unit memory systems, for example, in single DRAMs, or single tape drives, or CD ROMs. The data can be user data, such as a numerical representation of a photograph, or a large data file. The data can also be software, for example firmware. Firmware can be a low-level part of the operating system of the non-volatile memory system.

Figure 1:
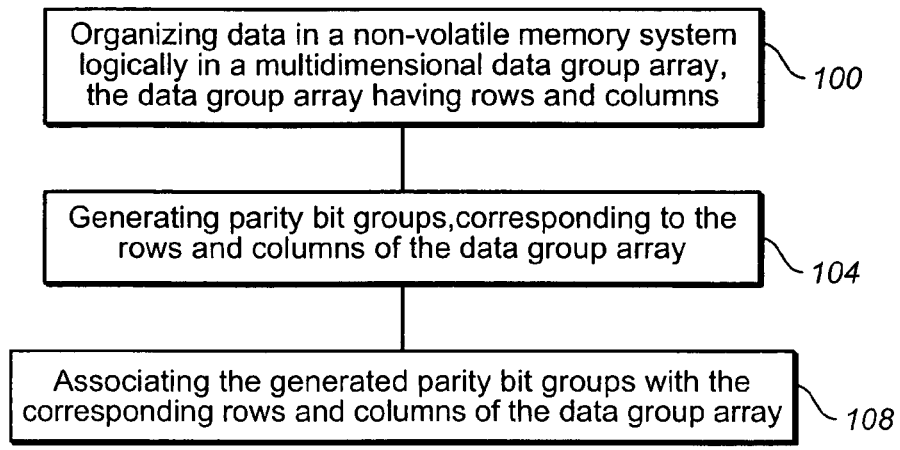
FIG. 1 illustrates steps of the method of generating supplementary parity bits.

FIG. 1 illustrates the steps of generating the parity bits as supplementary information. In step 100 the data are organized into a multidimensional data group array logically. The number of dimensions used may be one, two, three or more. The data groups are arranged to form rows in each dimension. The rows in different dimensions are orthogonal. For example, rows are orthogonal to columns in a two dimensional array. Similarly, rows extending in the X, Y and Z directions of a 3-dimensional array are orthogonal to each other. In some examples, rows may also be formed in a diagonal direction. Rows are generally formed so that no two rows contain more than one common data group. Examples of the individual data groups include matrices. The matrices can be square or rectangular matrices. In these matrices the data are organized into rows and columns. More explicitly, the data within an individual data group can be organized into matrices of a suitable dimension. The matrices can be of the N×N× . . . N type, referred to as hyper-cubic matrices. A two-dimensional hyper-cubic matrix is the square matrix of the N×N type. The matrices can also be non-hyper-cubic, for example, of the N×M type, where N is not equal to M. Examples of such matrices include N×1 matrices, also known as vectors. While logically the data are organized into matrices, in some embodiments physically the data are not organized into matrices. Instead, the data are only indexed as if they were elements of a matrix, while physically the data can be organized into some other format. In embodiments with two-dimensional square matrix design the data of an individual data group are indexed by the row index i and the column index j. These indices can take on integer values between 1 and N, or 0 and (N−1). Then the indexed data are treated as if it belonged to an N×N matrix, even if physically the data are not organized into a matrix. In vector embodiments the data of an individual vector data group are indexed linearly by a single index i, which takes on values between 1 and N, or 0 and (N−1). It is not necessary that all rows in a particular dimension contain the same number of data groups. Thus, in an N×M type array having N columns and M rows, some rows may contain fewer than N data groups and some columns may contain fewer than M data groups. Data stored in a memory may be mapped to data groups in various ways. Also, data groups may be logically mapped to rows in one or more dimensions in various ways. No particular mapping schemes are required. In some examples, a mapping scheme may be chosen based on the physical locations in which the data are stored so that physical defects are less likely to affect multiple data groups. In other examples, mapping may be independent of the physical locations at which data are stored in the memory array.

In step 100 the individual data groups are arranged in a data group array D logically. Now the data groups themselves are organized into orthogonal rows and columns within the data group array. An example is the design where square matrices are organized into a square matrix of these matrices. More explicitly, the data group array D can be a hyper-cubic matrix of individual data groups, the data group array being of the N'×N'× ... N' type. The data group array can also be of a non-hyper-cubic type, for example, an N'×M' matrix, where N' is not equal to M'. Here the integers N' and M' can be different from N and M. While logically the data groups are arranged into the data group array D, physically the data groups can be arranged in some other format. In the data group array D the data groups are indexed as $D^{kh}$, where the k row index and the h column index can take on integer values between 1 and N', or 0 and (N'−1) in a N'×N' square matrix design. To unify the above introduced indexing schemes, $D^{kh}_{ij}$ will refer to the individual item of data in the i-th row and j-th column of an individual data group, which is located in the k-th row and h-th column of the data group array D. In vector embodiments, where the items of data are indexed linearly within a data group, the indexing scheme $D^{kh}_i$ will be used, referring to the i-th item of data of the individual data group, which is located in the k-th row and h-th column of the data group array D. In the following we will use the $D^{kh}_{ij}$ indexing scheme. $D^{kh}_{ij}$ refers to a matrix-like organization of the items of data within a data group, but it is understood that there are equivalent embodiments with a vector-like organization of the items of data within a data group, denoted as $D^{kl}_i$, as well as embodiments with higher dimensional matrices.

Figure 2:
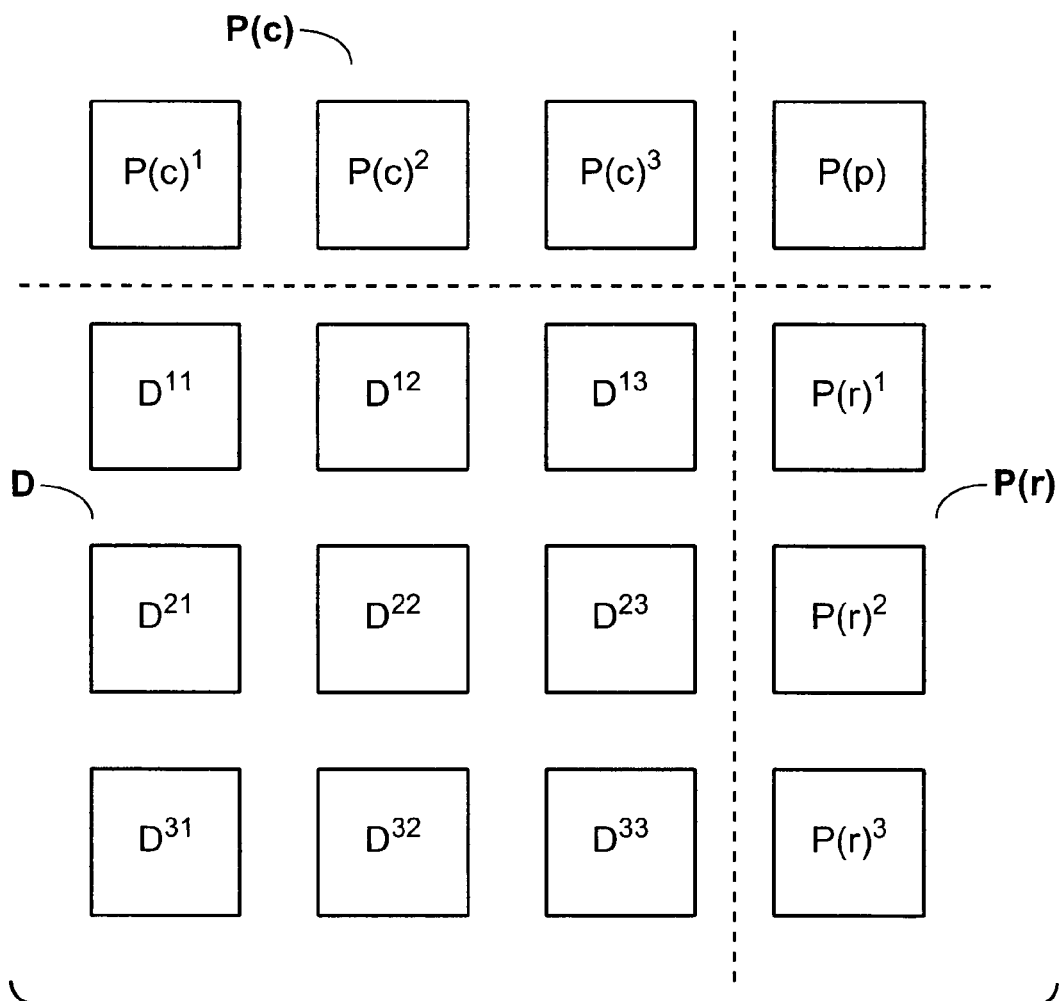
FIG. 2 illustrates a logical organization of the data and the parity bits according to one embodiment.

FIG. 2 illustrates a data group array D with a 3×3 square matrix design. The data group array D is bounded by the dotted lines. The individual data groups $D^{11}$-$D^{33}$ are organized into a 3×3 matrix. Each data group $D^{kh}$ is a matrix of individual items of data $D^{kh}_{ij}$. The individual items of data can be, for example, bits or bytes. In some embodiments the number of data bytes within an individual data group is between 32 and 4096, for example, 512.

Referring back to FIG. 1, in step 104 of the method, parity bit groups are generated that correspond to the rows or columns of data groups within the data group array D. The parity groups include parity bits. The parity bits of a row's or column's parity bit group can be generated by performing logical operations on the individual items of data of the row's or column's data groups. More explicitly, the parity bits are generated by performing logical operations on the items of data, having the same indices along the rows and columns of the data group array. In formula, the $P(r)^k_{ij}$ parity bit, which is in the i-th row and j-th column of the parity group $P(r)^k$, corresponds to the row (hence the (r) index) with the index k of the data group array. Analogously, the $P(c)^h_{ij}$ parity bit, which is in the i-th row and j-th column of the parity group $P(c)^h$, corresponds to the column (hence the (c) index) with the index h of the data group array. The parity bits within the $P(r)^k$ and $p(c)^h$ parity groups are generated by performing logical operations on the (i,j) items of data of the k-th row or h-th column, respectively. In some embodiments the logical operations include XOR operations:

$$P(r)^k_{ij} = xor(h) D^{kh}_{ij};$$

$$P(c)^h_{ij} = xor(k) D^{kh}_{ij}.$$

In other embodiments, the logical operations include summations:

$$P(r)^k_{ij} = sum(h) D^{kh}_{ij};$$

$$P(c)^h_{ij} = sum(k) D^{kh}_{ij}.$$

Here, for example, the "xor(l) $D^{kh}_{ij}$" notation means that the xor operation is performed on the $D^{kh}_{ij}$ items of data with fixed k, i, and j indices, the h index running from 1 to N, or 0 to (N−1). The analogous notation was used for the summation as well. It is noteworthy that in memory systems where the individual items of data are stored in the byte format, the xor operation can be carried out either bit-by-bit, or byte-by-byte, as each of these operations yield the same result. At the same time the summation method yields different results, if performed bit-by-bit, or byte-by-byte, because of the carryover bits. Some embodiments use the bit-by-bit procedure, others the byte-by-byte procedure.

In a matrix where some rows contain fewer data groups than other rows, parity bits may still be generated for the different rows. One or more extra data groups may be generated to pad-out a row of data groups that contains fewer data groups. For example, where summation is used, a data group containing all zeros could be used to pad out a row. Such padding data does not have to be written to the memory array but may be generated for computation purposes. Alternatively, parity groups can be calculated from a reduced number of data groups. Where a reduced number of data groups is present in a row, the location that does not contain a data group may be recorded so that calculations are adjusted whenever the location would be used for parity group calculation. Thus, instead of generating padding data and using the padding data in calculations, it is recorded that the calculation was performed based on fewer data groups. This may be quicker than generating padding data.

Figure 3:
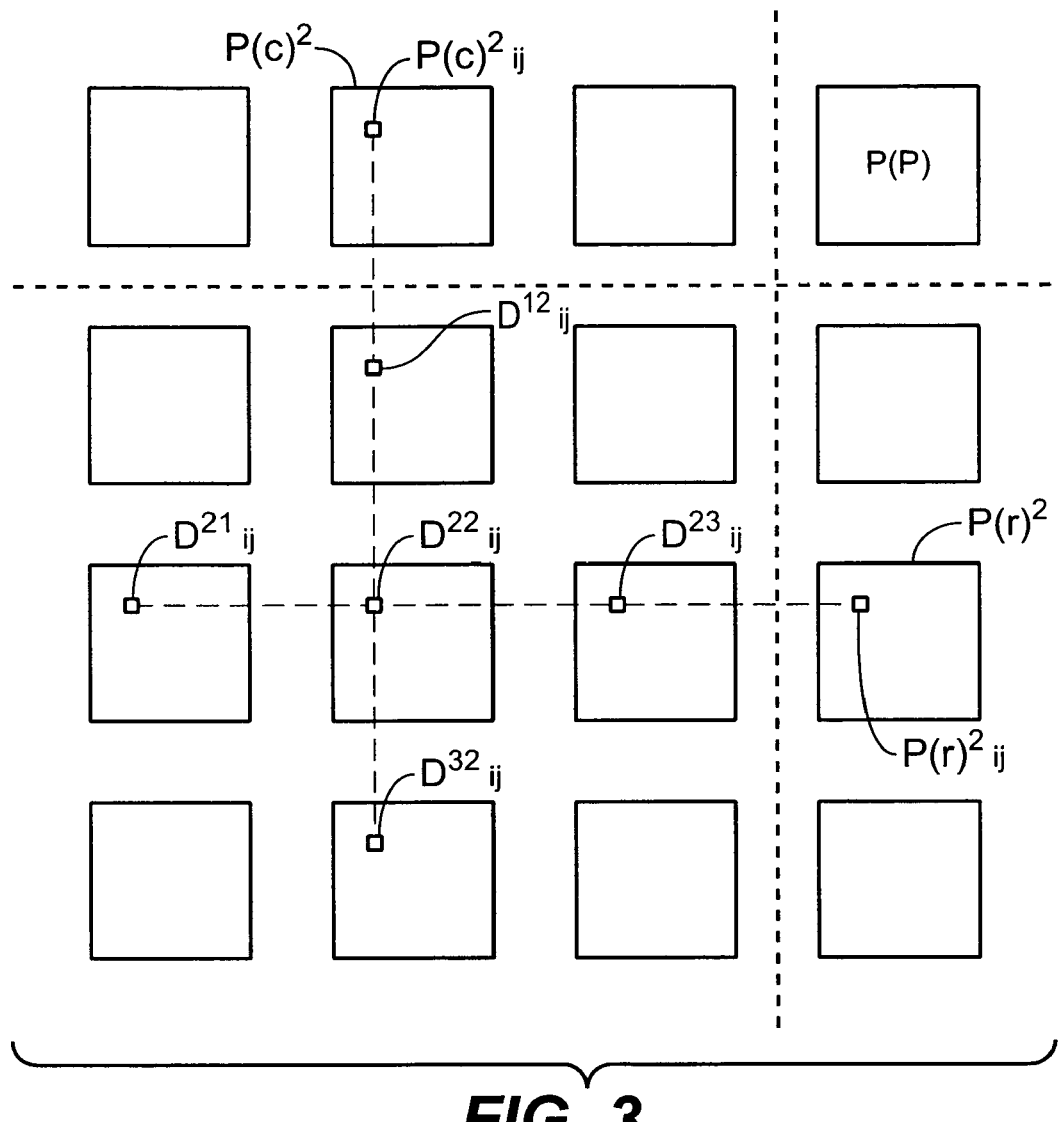
FIG. 3 illustrates the items of data corresponding to a parity bit according to one embodiment.

FIG. 3 illustrates the generation of parity bits in the data group array D with a 3×3 matrix design. The parity group $P(r)^2$, corresponding to the second row of the data group array D, is generated by first selecting an (i,j) index pair, then selecting the (i,j) items of data in the data groups of the second row, $D^{2h}_{ij}$, indicated by the little boxes in the second row. Then, the (i,j) parity bit $P(r)^2_{ij}$ of the parity group $P(r)^2$ is generated, for example, by xor-ing the (i,j) items of data of the individual data groups of the second row of D:

$$P(r)^2_{ij} = xor(h) D^{2h}_{ij} = D^{21}_{ij} \, xor \, D^{22}_{ij} \, xor \, D^{23}_{ij},$$

where h runs from 1 through 3, the number of individual data groups in the second row. The xor-ed items of data are connected by the dashed horizontal line in FIG. 3. Analogously, the parity bits corresponding to the second column of the data group array D are generated as:

$$P(c)^2_{ij} = xor(k) D^{k2}_{ij} = D^{12}_{ij} \, xor \, D^{22}_{ij} \, xor \, D^{32}_{ij}.$$

Referring back to FIG. 1, in step 108 of the method the generated parity bit groups P(r) and P(c) are associated with the corresponding rows and columns of the data group array D. In some embodiments the parity group $P(r)^k$, generated from the data groups of row k, is logically appended to the k-th row, as illustrated in FIG. 2 and FIG. 3. Similarly, the parity group $P(c)^h$, corresponding to the h-th column, is logically appended to the h-th column. Logical appending does not necessarily imply that the parity bit groups are also appended physically. Instead, in some embodiments the parity groups are only indexed as if they were adjacent to the corresponding row or column of the data groups, even if physically the parity bit groups are located somewhere else.

FIG. 2 and FIG. 3 further include the parity group of parity groups, P(p). In some embodiments the (i,j) element of P(p) is calculated by performing logical operations on the corresponding elements of the column and row parity groups. More explicitly in formula:

$$P(p)_{ij} = [xor(k)P(r)^k{}_{ij}] \; xor \; [xor(h)P(c)^h{}_{ij}].$$

In the particular example of FIG. 2 and FIG. 3, $$P(p)_{ij} = [P(r)^1{}_{ij} \; xor \; P(r)^2{}_{ij} \; xor \; P(r)^3{}_{ij}] \; xor \; [P(c)^1{}_{ij} \; xor \; P(c)^2{}_{ij} \; xor \; P(c)^3{}_{ij}].$$

Figure 4:
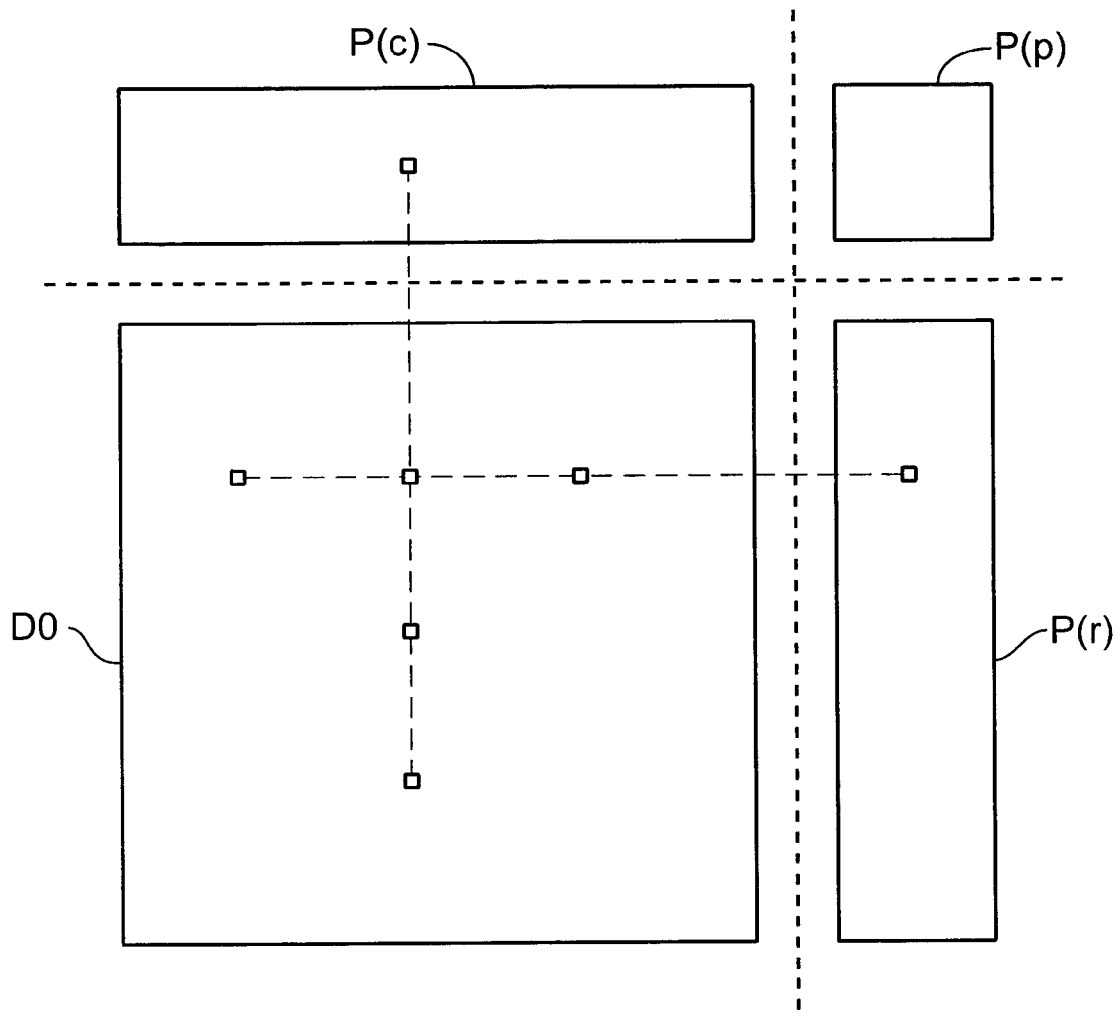
FIG. 4 illustrates the items of data corresponding to a parity bit according to another embodiment.

FIG. 4 illustrates that in some embodiments the data group array D includes only one data group $D^0$. In other words, the data are organized into the single large data group $D^0$. In a specific example, the data group $D^0$ can be a matrix of the N×N type, though in other embodiments the matrix may be other than square. In this embodiment parity bits are generated by performing a logical operation, such as xor-ing or summing every M-th item of data along the rows of the data group $D^0$, as indicated by the dashed line. The thus-generated parity bits are organized into a row parity group P(r), which is then appended to the side of the data group $D^0$ in the form of an N×M type matrix, at least logically. Analogously, parity bits are generated by performing a logical operation, such as xor-ing or summing every M-th item of data along the columns of the data group D0. The thus-generated parity bits are organized into a column parity group P(c), which is then appended to the top of the data group D0 in the form of an N×M type matrix, at least logically.

The above-described generation of supplementary parity bits can be performed before, during, or after the loading of the data into the non-volatile memory system. The parity bits can also be generated by suitable hardware or software either in the non-volatile memory system or elsewhere. For example, parity bits may be generated by circuits formed on one or more non-volatile memory chips or on one or more controller chips. Parity bits may be generated by software running on a controller of a memory system (firmware). In other embodiments the parity bits can be generated by software or hardware outside the memory system. Examples include processing user or firmware data before loading it into the memory system by software.

Also, as part of the loading process, Error Correction Codes (ECCs) are computed in conjunction with the individual data groups, and appended to the corresponding data groups, at least logically. Many different Error Correction Codes are known in the art. The present invention can be practiced in conjunction with any suitable ECC.

Figure 5:
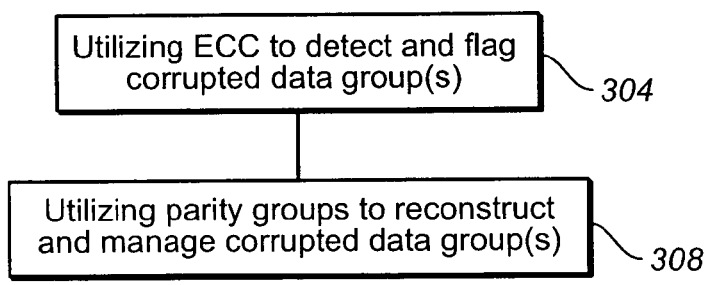
FIG. 5 illustrates the steps of a method of using parity bits to manage corrupted data.

FIG. 5 illustrates the steps of data reconstruction as part of the reading out process, according to some embodiments of the invention. When the data group array D is read out from the memory system, in step 304 the appended Error Correction Codes (ECCs) are used to detect whether the individual data groups are corrupted. Upon the reading of a data group, the ECC is recomputed and compared to the appended ECC. If the two ECCs agree, the data group is judged to be non-corrupted. If, however, the two ECCs differ, the data group is judged to be corrupted and is flagged accordingly.

In step 308 the supplementary parity bits are utilized to reconstruct and manage the corrupted data group(s). There are many known methods that use ECCs for reconstructing corrupted data. However, as mentioned earlier, the reconstruction of corrupted data using ECCs consumes considerable time. The time needed to perform ECC correction of a portion of data is generally a function of the number of errors encountered in the portion of data. In many applications speed is a critical factor of the performance of the memory system. In some cases, corrupted data groups can be reconstructed faster utilizing the supplementary parity bit groups of the present invention, than by using ECCs. Therefore, in some embodiments the ECCs are utilized to detect corrupted data groups, and the parity bit groups are utilized to reconstruct and manage the corrupted data groups. In other embodiments, detection of corrupted data groups may be achieved using parity groups, or a combination of parity groups and ECC, and reconstruction may be done using either parity groups or ECC or a combination of both parity groups and ECC.

FIG. 6 illustrates reconstruction and management of corrupted data groups according to an embodiment of the present invention. In step 302 the reconstruction process starts by initializing a pointer that indicates a first data group that is subject to the subsequent process steps. The pointer may be incremented during the process so that it steps through all the data groups of the array in some sequence. Data groups may be processed in any suitable sequence. In some cases the sequence may depend on the physical locations at which particular data groups are stored, though in other examples the sequence is independent of the physical locations at which the data groups are stored. In step 306 the ECC is utilized to detect the presence of a corrupted data group. If the ECC detects the presence of a corrupted data group, then in step 312 a row or column is sought, in which the corrupted data group is the only corrupted data group. This search involves utilizing the ECCs of the other data groups of the row and the column of the corrupted data group to detect whether or not the other data groups of the row or column are corrupted. In higher dimensional embodiments the search proceeds through the rows and columns to which the data group belongs, if necessary, in all dimensions. As in the present method the rows and columns play essentially equivalent roles, for simplicity both rows and columns are referred to as "rows." The term "row" may refer to two or more elements extending in any dimension. For example, in an N-dimensional array of data groups, rows of data groups extend in all N dimensions and parity bit groups may be calculated for rows in all N dimensions. If a row is identified in which the only corrupted data group is the detected corrupted data group, then in step 316 the parity group of that row is read in. In step 320 the ECC of the row's parity group is recomputed and used to check whether the row's parity group itself is corrupted. If the row's parity group is not corrupted, then in step 324 the row's parity group, along with the non-corrupted data groups of the row are used to reconstruct the corrupted data group. If, for example, the 2nd data group of the k-th row, $D^{k2}$ is corrupted, then the reconstruction is performed by discarding the entire corrupted data group $D^{k2}$ and replacing it by a reconstructed data group $R^{k2}$. The (i,j) elements of the reconstructed data group $R^{k2}$ are computed by xor-ing the (i,j) elements of the remaining data groups of the k-th row together with the (i,j) element of the parity group of the row:

$$R^{k2}{}_{ij} = D^{k1}{}_{ij} \; xor \; D^{k3}{}_{ij} \ldots xor \; D^{kN}{}_{ij} \; xor \; P(r)^k{}_{ij}.$$

In embodiments where the parity groups were generated by summation instead of xor-ing, the reconstruction also utilizes computation such as summation and subtraction to reconstruct the corrupted data group. After the successful reconstruction of a corrupted data group, in step 336 it is investigated whether the reconstructed data group was the last data group of the data group array D. If not, then the pointer is incremented so that the next data group is read in step 340 to repeat the reconstruction process 306-340.

If the row's parity group is corrupted, then the search is resumed for a row where the corrupted data group is the only corrupted data group. In step 328 it is investigated whether some of the corrupted data group's rows are still unchecked. If there are unchecked rows, then, by returning to step 312, these rows are checked to see whether the corrupted data group is the only corrupted data group in any of these rows. If there are no more unchecked rows, then in step 332 the attempt to reconstruct the detected corrupted data group is suspended and the corrupted data group is flagged for later reconstruction. Next, in step 336 it is investigated whether the reconstructed data group was the last data group of the data group array D. If not, then the pointer is incremented and the next data group is read in step 340 to repeat the reconstruction process 306-340.

The reconstruction process is repeated until the reconstruction of the last data group of the data group array D is attempted, as identified by step 336. Attempting the reconstruction of every corrupted data group in D and its associated parity groups once will be called a sweep of data group array D. Once the reconstruction of all corrupted data groups has been attempted, i.e. one sweep of the data group array D and its parity groups has been completed, in step 344 it is investigated, whether any of the data groups are flagged. These flags indicate whether the attempted reconstruction of any of the data groups were unsuccessful. If there are any flagged data groups in the data group array D and its parity groups then the reconstruction of these flagged groups is attempted by a subsequent sweep of the data group array D and its parity groups, starting in step 352 and repeating steps 312-340. While this example deals with reading and performing a reconstruction process for all data groups of a data group array, the process may also be carried out for a portion of a data group array. For example, where fewer than all the data groups of an array are requested by a host, the requested data groups and any additional data groups and parity groups necessary to reconstruct the requested data groups may be read, without reading the remaining data groups of the data group array.

Data group array D is swept again because after a sweep of D previously flagged data groups may have become reconstructable. This is so because after the reconstruction of some corrupted data groups during a sweep of data group array D, a previously flagged corrupted data group may have become the only corrupted data group in one of its own rows, and therefore it may have become reconstructable. An example is a corrupted data group $D^{kh}$ that had another corrupted data group in each of its rows, and therefore it was unreconstructable and flagged. If, during the sweep of D, the other corrupted data group in a particular row of $D^{kh}$ was reconstructed, then by the end of the sweep $D^{kh}$ itself became the only corrupted data group in that particular row, and therefore it became reconstructable. The repeated sweep of D will then be able to reconstruct $D^{kh}$. Various ways of reconstructing corrupted data group configurations are described below in relation to FIGS. 7A-C.

The success of the sweeps is tested by step 348 by checking whether the number of flags decreased since the last sweep. This test is naturally applied only after the second and subsequent sweeps, as there is nothing to compare to after the first sweep. The sweeps are repeated as long as they successfully reconstruct additional data groups, indicated by the decrease of the number of flags. In step 344 it is tested whether the number of flags has been reduced to zero by the last sweep. If the number of flags is reduced to zero, then all data groups and thus the whole data group array D has been successfully reconstructed utilizing parity groups (354).

If, however, the number of flags is not reduced to zero by repeated sweeps, and step 348 indicates that the number of flags remained unchanged since the last sweep, then the reconstruction of D by using parity groups alone was not successful. In this case, the reconstruction and the management of corrupted data groups is performed by utilizing the ECCs as well in step 360. Step 360 can involve one or more of the following sub-steps:

360-1: utilizing the ECC to reconstruct the corrupted data group;

360-2: replacing the corrupted data group by a separately stored copy of the corrupted data group, if the ECC is unable or too slow to reconstruct the corrupted data group; and

360-3: discarding the corrupted data group, if the corrupted data group is deemed unrecoverable or not worth recovering.

Sub-step 360-2 is practiced, for example, in memory systems where more than one copies of the data files have been stored. In these systems the unreconstructable corrupted data group can be replaced by another previously stored copy of the data group. If a whole configuration of data groups is unreconstructable, then a larger portion, possibly the whole data group array D can be replaced. Such situations include the reconstruction of the firmware in non-volatile memory systems. For reliability reasons the firmware is typically stored in several copies in the system, thus if the first copy of the firmware is unreconstructably corrupted, then the corrupted portion, or possibly the whole firmware can be discarded and replaced by another copy of the firmware. When a data group is reconstructed or replaced, the flag marking the data group as corrupted is removed.

After reconstruction is attempted using ECC in step 360, it is again determined whether the number of flagged data groups has decreased in step 364 (i.e. has reconstruction in step 360 been successful for any data groups). If there has been no decrease in the number of flagged data groups, then the process ends. If there has been a decrease in the number of flagged data groups, then reconstruction is attempted again starting in step 352, with the reduced number of flagged data groups.

In further embodiments additional "reconstructed" flags are associated with data groups, indicating whether they were reconstructed or not. If in a data group array the number of data groups with "reconstructed" flags exceeds some predetermined number, this might indicate some systematic problem in the memory system. Such problems may include unreliable loading of the data, or some physical irregularity of portions of the memory chip itself. Such systematic problems diminish the reliability of the whole data group array. Therefore, the flagged portions or possibly even the whole data group array may be discarded, even if the data reconstruction appears to be successful.

Related methods of reconstructing and managing corrupted data groups by utilizing ECCs have been described in U.S. Pat. No. 6,751,766, entitled "Increasing the effectiveness of error correction codes and operating multi-level memory systems by using information about the quality of the stored data," by D. Guterman, G. Gongwer, and S. Gross, hereby incorporated by reference in its entirety.

In alternative embodiments, if in step 320 a parity group is found to be corrupted, then the reconstruction of the parity group is attempted by utilizing P(p), the parity group of parity groups. This method requires that a whole row of parity groups is read in as well. The reconstruction is similar to the reconstruction of the corrupted data groups. For example, if $P(r)^3$ is corrupted, then the other, non-corrupted parity groups of the row of $P(r)^3$ are read in an xor-ed with the parity group of parity groups $P(p)$ to reconstruct or replace the corrupted parity group $P(r)^3$:

$$P(r)^3{}_{ij} = P(r)^1{}_{ij} \text{ xor } P(r)^2{}_{ij} \text{ xor } P(r)^4{}_{ij} \ldots \text{ xor } P(r)^N{}_{ij} \text{ xor } P(p)_{ij}.$$

Alternatively, where a parity group is shown to be corrupted by ECC but is in a row that contains only uncorrupted data groups at the time that the reconstruction is attempted, the parity group may be reconstructed from the uncorrupted data groups in the same manner that the parity group was originally calculated (XOR, summation or other operation).

Figure 7A:
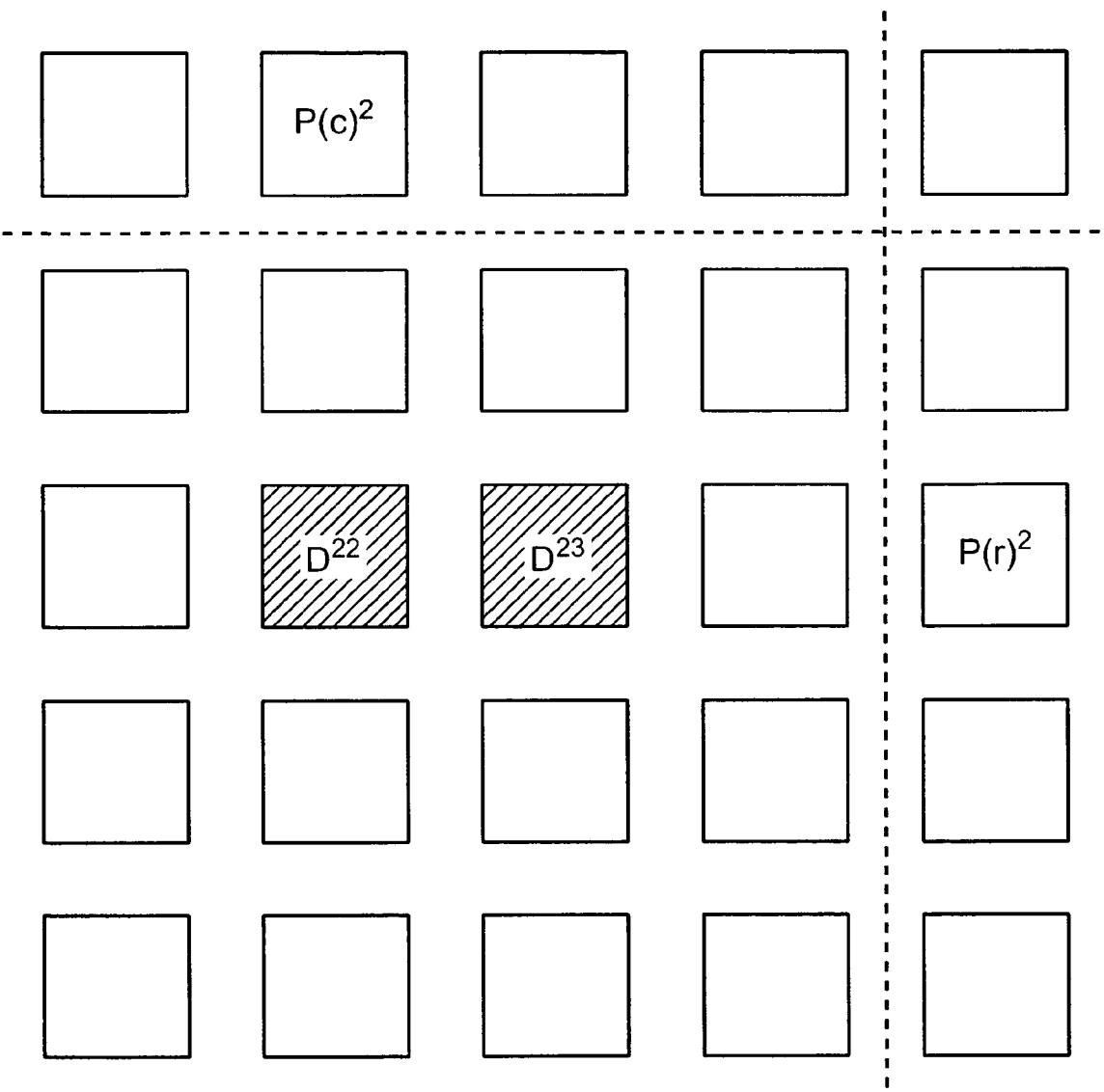
FIGS. 7A-7C illustrate different configurations of corrupted data groups in relation to using parity bits to reconstruct corrupted data groups.
Figure 7B:
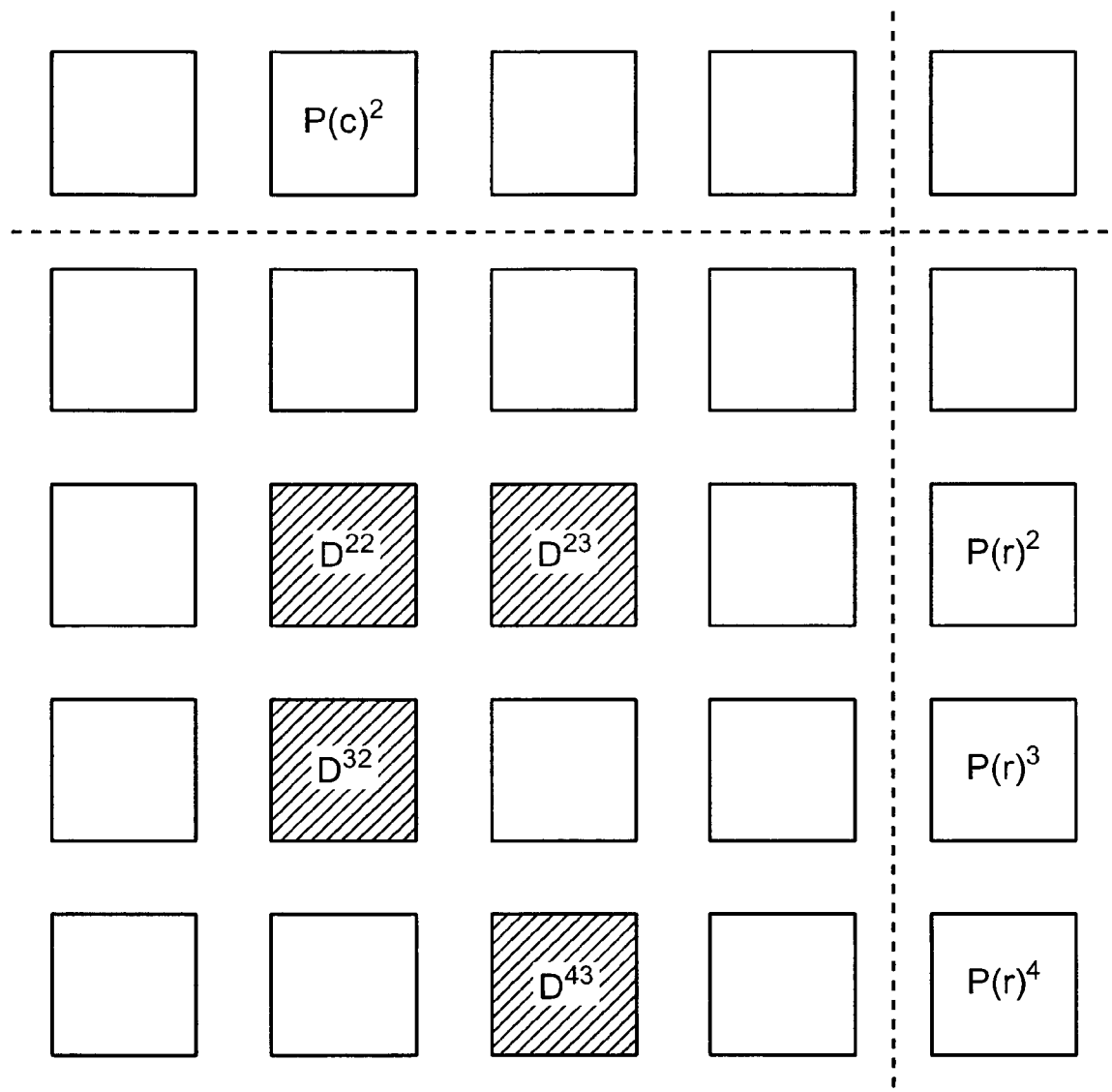
Figure 7C:
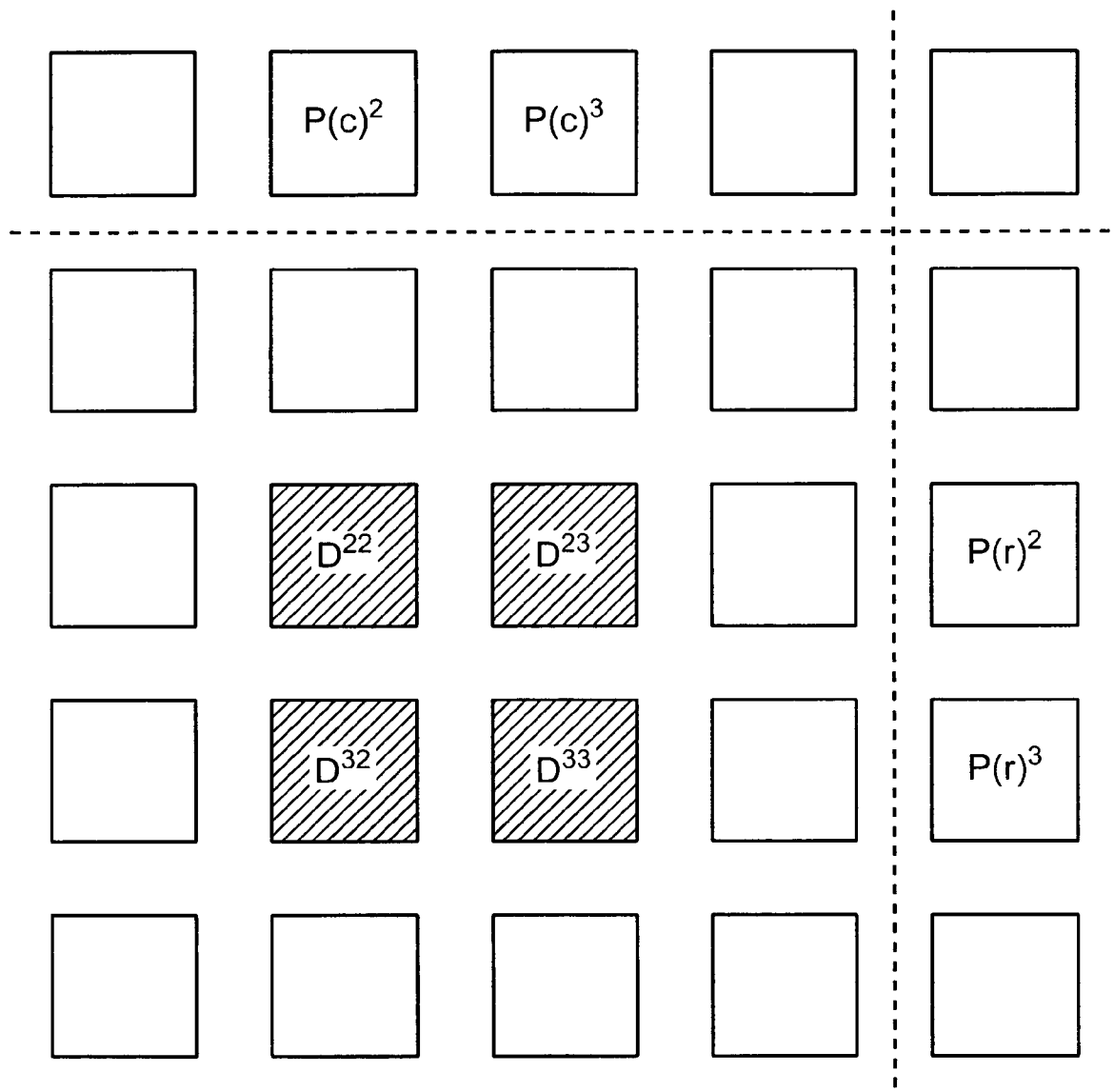

FIGS. 7A-C illustrate corrupted data group configurations where repeated sweeps can change unreconstructable corrupted data groups into reconstructable corrupted data groups.

FIG. 7A illustrates a corrupted data group configuration, where two data groups, $D^{22}$ and $D^{23}$ are corrupted, and therefore the row parity group $P(r)^2$ cannot be used to reconstruct the corrupted data group $D^{22}$ by practicing step 324. Therefore, by repeating step 312, additional "rows" are sought to which $D^{22}$ belongs. This search identifies the second vertical "row" (in the specific example, column), in which $D^{22}$ is the only corrupted data group. In this "row" step 324 can be practiced to reconstruct the corrupted data group $D^{22}$ by utilizing the parity group $P(c)^2$.

FIG. 7B illustrates a corrupted data group configuration, where in addition to $D^{22}$ and $D^{23}$, $D^{32}$ and $D^{43}$ are also corrupted. In this case no "rows" can be found by repeating step 312, in which $D^{22}$ or $D^{23}$ would be the only corrupted data group. Therefore, the method reaches step 332, where it suspends the effort to reconstruct the corrupted data groups $D^{22}$ and $D^{23}$, and flags these corrupted data groups with a "not-yet-reconstructed" flag, or some equivalent of it.

Next, the method returns to the sweep of the data group array D in steps 336-340 by attempting to reconstruct the next corrupted data group, which is $D^{32}$ in the present example. In the present example $D^{32}$ is the only corrupted data group in its own horizontal row, so $D^{32}$ can be reconstructed by practicing the steps 306-324. Corrupted data groups that are the lone corrupted data group in one of their rows will be called the "weak points" of their corrupted data group configuration. The reconstruction of corrupted data group configurations can be started at such weak points. Having finished the reconstruction of $D^{32}$ the method moves on to the corrupted data group $D^{43}$, which is also a weak point, and hence can be reconstructed by practicing the steps 306-324. Reconstructing $D^{32}$ and $D^{43}$ finishes the first sweep of the data group array D. With this the method reaches step 344 and recognizes that there are two flags remaining. Since this is a first sweep, the method simply passes through step 348 and returns for a second sweep to finish the suspended reconstruction of $D^{22}$ and $D^{23}$ in step 352. In the present corrupted data group configuration, after having reconstructed the corrupted data groups $D^{32}$ and $D^{43}$, $D^{22}$ and $D^{23}$ are now the only corrupted data groups in their respective vertical rows, or equivalently, columns. Therefore, by practicing the steps 306-324, the corrupted data groups $D^{22}$ and $D^{23}$ can be reconstructed as well, using the corresponding column parity groups $P(c)^2$ and $P(c)^3$. Therefore, the present method is capable of reconstructing the entire corrupted data group configuration in two sweeps using the parity groups in an efficient and fast manner.

FIG. 7C illustrates a corrupted data group configuration, where even repeated sweeps of the data group array D are unable to reconstruct the corrupted data groups by using the parity groups and data groups to reconstruct the data. This is so because the corrupted data groups form a square within the data group array. Thus none of the corrupted data groups are alone in any of their rows or columns. Such square configurations do not have weak points, as defined above, where the reconstruction of the corrupted data groups could be started. The just described corrupted data group square is just one example of unreconstructable configurations. When even the repeated sweeps of the data group array D result in unreconstructable configurations like that of FIG. 7C, the corrupted data groups should be reconstructed and managed by utilizing the ECCs as in step 360.

While FIGS. 7A-7C illustrated the steps of the method on a two-dimensional configuration of data groups, other embodiments of the method can utilize one, three or higher dimensional configurations. An advantage of higher dimensional configurations is that there are more rows along which data reconstruction can be attempted, hence higher dimensional embodiments have better data reconstruction capabilities. However, higher dimensional embodiments also utilize a larger number of parity groups, thus the overhead cost of these embodiments is higher as well.

The various aspects of the above-described two dimensional method have to be generalized to higher dimensions in a natural way. For example, in a three-dimensional data group array the square of corrupted data groups is a reconstructable configuration. One example of a generalized unreconstructable configuration is a cube of corrupted data groups.

A further advantage of the method is that the parity groups are not read into local memory (such as RAM) until the ECC detects a corrupted data group. This means that there is negligible time-overhead, or lag, until a corrupted data group is detected. The location of data groups or parity groups in local memory may be tracked to avoid rereading the same data group or parity group during the reconstruction process.

While in some of the systems described above ECC correction may be prohibitively slow compared with correction using a parity group, for many memory systems using newer ECC techniques, ECC correction may be performed rapidly (typically, a few microseconds). This may be more rapid than correction using a parity group (typically, a few milliseconds). Therefore, for such systems, it is generally better to perform ECC correction where possible and only use parity group correction where there are too many errors in the data for ECC to reliably correct the data. The ability of ECC to correct the data generally depends on the particular algorithm used and the amount of ECC data generated. Examples of ECC algorithms include Reed-Solomon, BCH and Hamming algorithms. For a sector having 512 bytes of user data, 9 bytes of ECC data may be provided for the sector. This level of ECC data allows up to 4 bits of erroneous data to be corrected with absolute reliably and allows detection of 7 or more bits of erroneous data. For such a sector, if 4 or fewer bits are in error then the erroneous bits may be corrected (flipped). If more than 4 bits are in error, a parity group may be used to reconstruct the sector. ECC is still used to detect the errors in such sectors so that every sector is first analyzed by ECC circuits and is only designated for reconstruction by a parity group method where the errors are not ECC-repairable. Different levels of ECC provide different degrees of repairability and detection of errors. However, it is generally possible to detect a greater number of errors than it is possible to repair. Thus, for data with a number of errors that is too many to be repaired by ECC but is still detectable by ECC, using a parity group to reconstruct the data group containing the errors provides a way to obtain corrected data.

Figure 8:
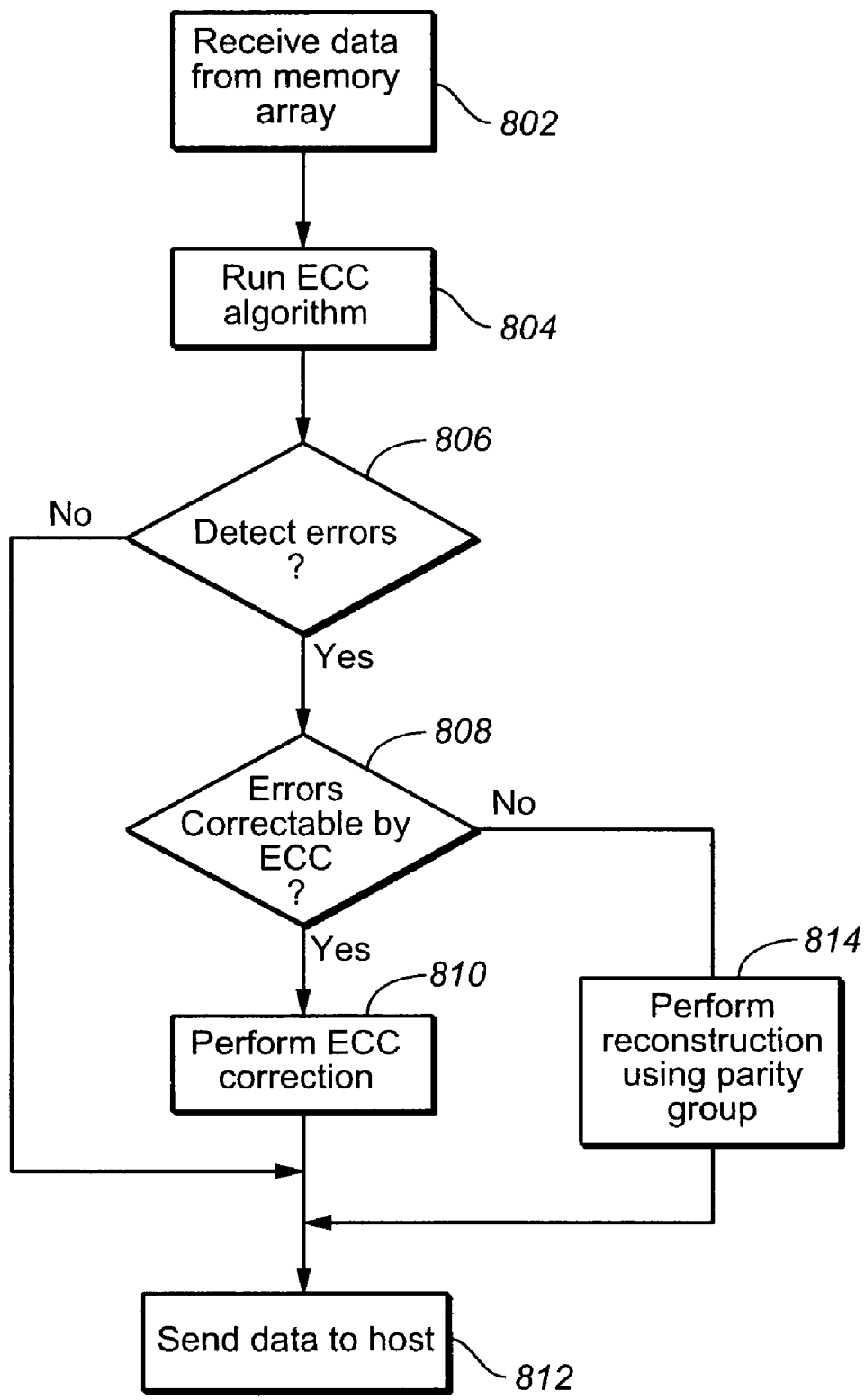
FIG. 8 is a flowchart for a data correction scheme according to an embodiment of the present invention.

FIG. 8 shows a flowchart for correcting user data that is received from a memory array. The unit of data for this correction may be a sector or some other unit of data. First, data is received from a memory array in step 802. Next, an ECC algorithm is applied to the received data (step 804) and it is determined if there are any errors in the data in step 806. If no errors are found then the data is sent to the host in step 812. When a small number of bits are erroneous, they may be corrected by ECC (step 810) and the data may be sent to the host in step 812. The maximum correctable number of bits depends on the amount of ECC data. ECC generally works by estimating the most probable original user data that would produce the corrupted data received. Where the difference between original data and corrupted data is small, the original data may be estimated with a high probability. Where the difference is larger it may not be possible to estimate the original data. However, ECC may still indicate the presence of errors, even where it cannot reliably correct them. If such errors are detected then the data is corrected by performing reconstruction using other data groups in a row and the associated parity group (step 814) as previously described. The reconstructed data is then sent to the host. ECC algorithms are applied to a unit of correction called a "word," this means that each word has ECC data calculated for it. The ECC data for a word is derived only from the data in that word and is not affected by data in other words. In one example, the word used for calculating ECC data is a sector.

In one example, a host sends data in an addressable unit of a sector. A sector may be the basic unit of data over which an ECC algorithm is applied and for which ECC data is generated with each sector having ECC data that is not dependent on data in other sectors. In contrast, parity groups are calculated for multiple data groups where a data group may be a sector of data. Where sectors are treated as data groups, a parity group has the same size as a sector of user data and may be referred to as a parity sector. The data groups of a row (or stripe) are other sectors of user data. A parity group may also have a portion corresponding to header and ECC data of sectors. A parity group may have ECC data that is generated from the parity group itself so that the parity group may be corrected by ECC. Thus, a parity sector may consist of 512 bytes of parity data, plus header and ECC data. A row of data groups may be made up of a number of sectors. In some memory array systems, it is advantageous to have a row size that corresponds to a unit of programming of the memory array.

Figure 9:
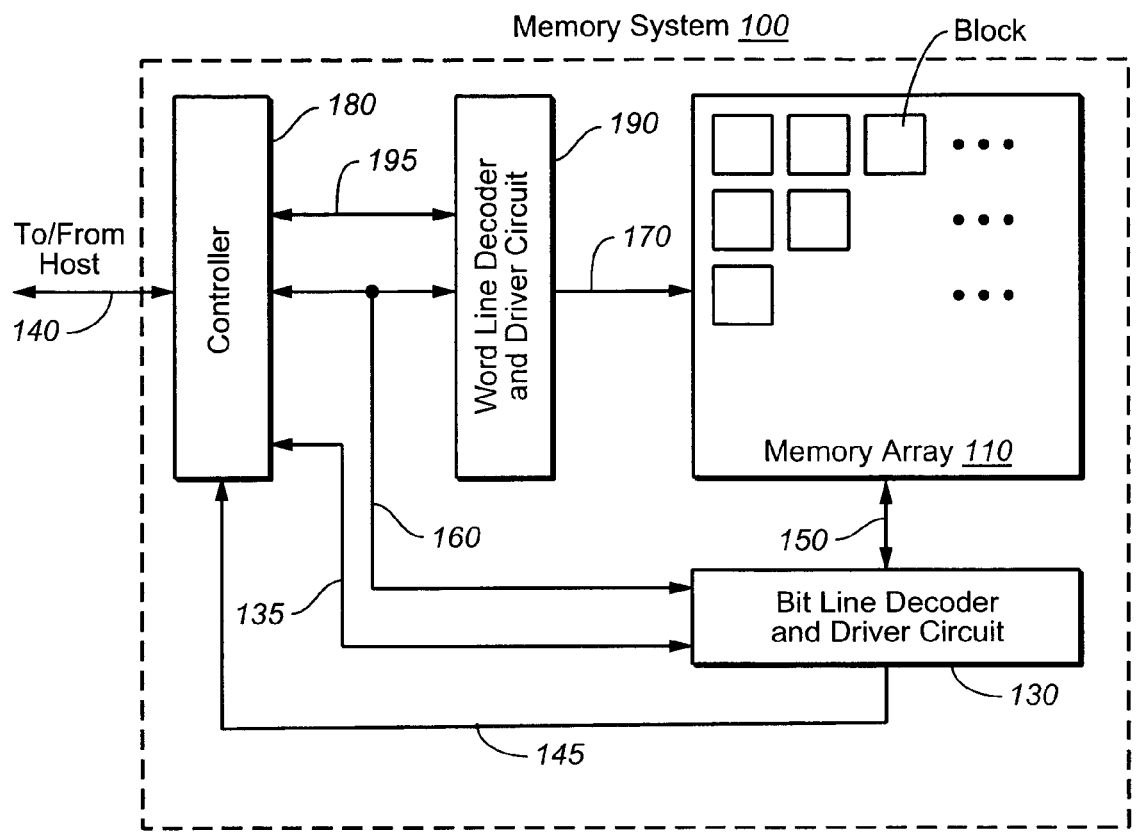
FIG. 9 illustrates a memory system having a memory array and a controller that may be used to implement aspects of the present invention.

FIG. 9 shows an example of a memory system that may be implemented as an embedded memory in a host, or may be implemented in a removable memory card that is connectable to a host by a standard interface. Examples of such removable memory cards having standard interfaces are Compact-Flash™ (CF) cards, MultiMedia cards (MMC), Secure Digital (SD) cards, Smart Media cards, personnel tags (P-Tag) and Memory Stick cards. Hosts include personal computers, notebook computers, personal digital assistants (PDAs), various data communication devices, digital cameras, cellular telephones, portable audio players, automobile sound systems, and similar types of equipment. A controller is connected to the host and to the memory array. The controller performs various functions to transfer data between the host and the memory array and manage data within the memory array. Some cards do not have a controller and in such systems the controller functions are performed by the host.

Figure 10:
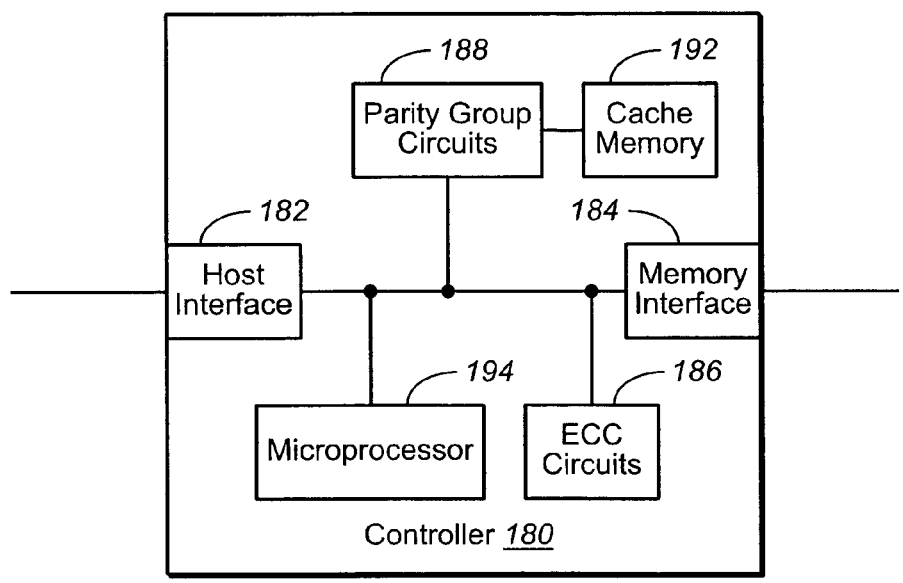
FIG. 10 shows the controller of FIG. 9 in more detail.

FIG. 10 shows a simplified block diagram of controller 180 of FIG. 9. Controller 180 is an Application Specific Integrated Circuit (ASIC) that is specifically designed for use with a memory array and has specific circuitry associated with management of a non-volatile memory array. Controller 180 has additional circuitry that is not shown in FIG. 10 for clarity. Controller 180 has a host interface 182 for communication with a host and a memory interface 184 for communication with a memory array. ECC circuits 186 are provided to perform ECC algorithms that calculate ECC data from user data. Such ECC data may be used to detect and correct errors as described above. Parity group circuits 188 are provided to generate parity groups for a particular row of user data or to reconstruct a data group from other user groups of a row and a parity group. A cache memory 192 is connected to the parity group circuits 188 to facilitate generation of parity data. However, in some examples, such a cache memory may not be necessary. Also shown is a microprocessor 194 that executes firmware to carry out tasks in response to host commands. Additional controller circuits may include Random Access Memory (RAM) and various registers and buffers.

In one type of memory array architecture (a NAND array) that may be used for memory array 110, strings of more than two memory cells, such as 16 or 32, are connected along with one or more select transistors between individual bit lines and a reference potential to form columns of cells. Word lines extend across cells within a large number of these columns. An individual cell within a column is read and verified during programming by causing the remaining cells in the string to be turned on hard so that the current flowing through a string is dependent upon the level of charge stored in the addressed cell. Cells of a NAND array are not generally individually erasable but are arranged in blocks, where a block is the minimum unit of erase. An example of a NAND architecture array and its operation as part of a memory system is found in U.S. Pat. No. 6,046,935, which patent is incorporated herein in its entirety by this reference. NAND memory devices have been found to be particularly suitable for mass storage applications such as those using removable memory cards.

Figure 11:
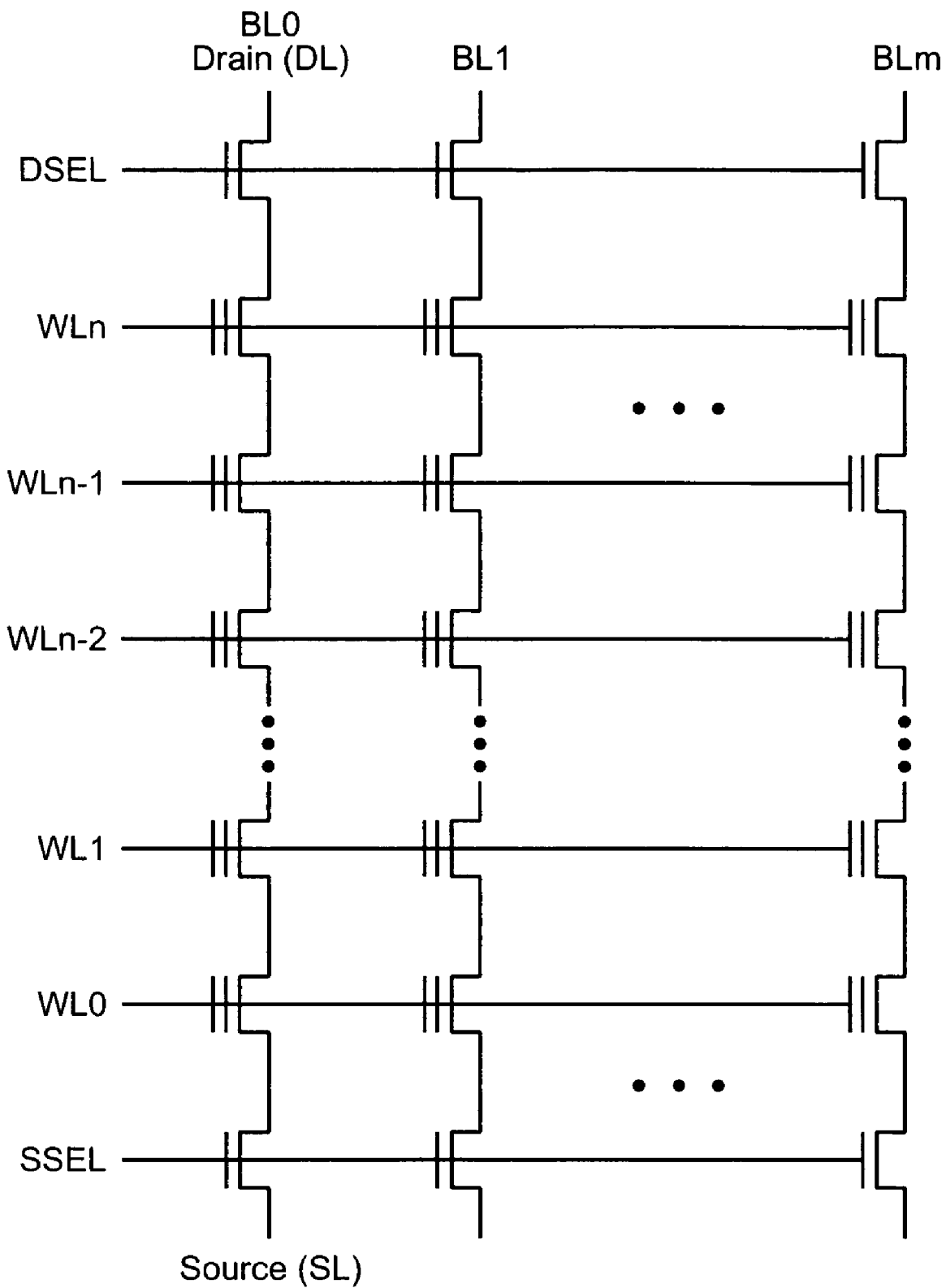
FIG. 11 shows a NAND memory array that may be used in the memory system of FIG. 9.

FIG. 11 shows a portion of the NAND memory array having multiple strings of floating-gate cells extending along bitlines (BL0-BLM) in the vertical direction. Select transistors at the ends of the strings are controlled by drain select DSEL and source select SSEL lines. Wordlines (WL0-WLn) extend across the array in the horizontal direction. In some NAND arrays, the minimum unit of programming is established by a wordline. In such arrays, when data is programmed to cells along a wordline, subsequent programming of other cells along the same wordline is prohibited because the stored data would be disturbed by the subsequent programming. The minimum unit of programming is called a "page." For NAND arrays a page generally extends across the array along a wordline. A page may store multiple sectors of data. For example, 4, 8, 16, or more sectors of data may be stored in a page. Typically, a block contains many pages. While programming less than a page may be physically possible by inhibiting strings that are not to be programmed, this may result in corruption of data and is not generally permitted.

It is continually desired to increase the amount of digital data that can be stored in a given area of a silicon substrate, in order to increase the storage capacity of a given size memory card and other types of packages, or to both increase capacity and decrease size. One way to increase the storage density of data is to store more than one bit of data per memory cell. This is accomplished by dividing a window of a floating gate charge level voltage range into more than two states. The use of four such states allows each cell to store two bits of data, eight states stores three bits of data per cell, and so on. A multiple state flash EEPROM structure and operation is described in U.S. Pat. Nos. 5,043,940 and 5,172,338, which patents are incorporated herein by this reference. In some examples, the possible states of cells may be divided into pages. For example, in an array where cells have four possible states, the two lower states may represent a bit of a lower page while the two upper states may represent a bit of the upper page.

Figure 12A:
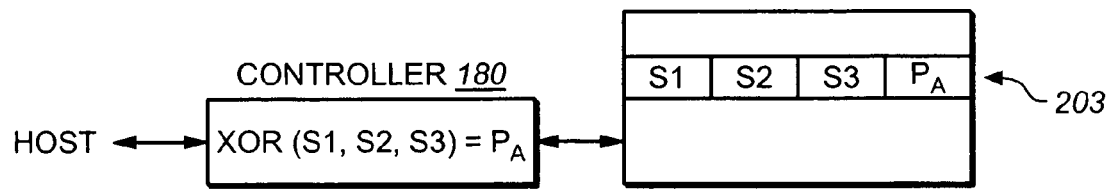
FIG. 12A shows an example of generation of a parity sector from data sectors, with the data sectors and the parity sector stored together in a single page.

In one embodiment, the sectors of a page are used as data groups to obtain a parity group (or parity sector). The parity sector may either be stored in the page with the other sectors from which it was obtained, or may be stored separately. FIG. 12A shows a controller that receives three sectors of user data S1, S2 and S3 from a host. The controller performs an XOR operation on S1, S2 and S3 to obtain parity sector $P_A$. Subsequently, S1, S2, S3 and $P_A$ are stored in a page 203 of the memory array. In this example, a page contains four sectors of data so that S1, S2, S3 and $P_A$ occupy the whole of page 203. Sectors S1, S2, S3 and $P_A$ are programmed in parallel in a single programming operation so that a page is only written once and data is not disturbed by multiple write operations to the same page.

Figure 12B:
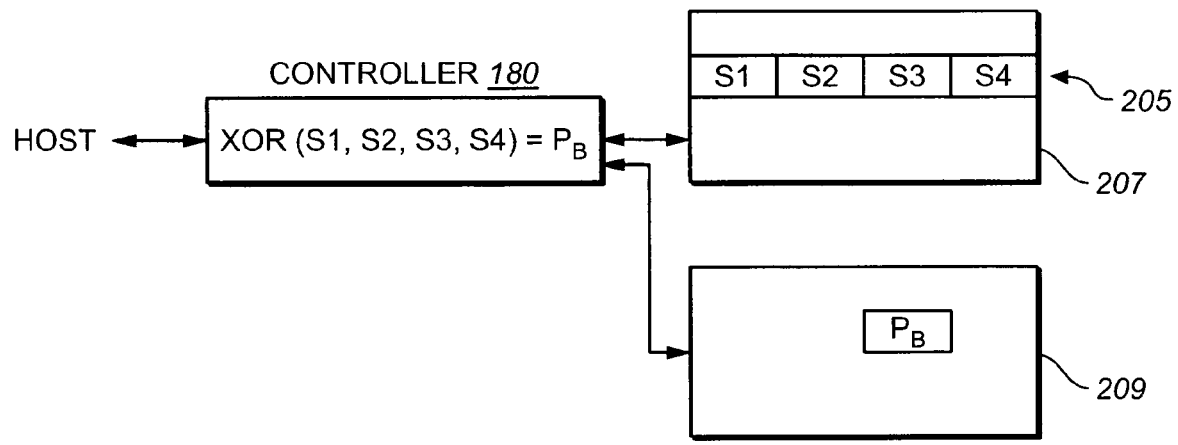
FIG. 12B shows generation of a parity sector from data sectors, with the data sectors stored in a single page and the parity sector stored elsewhere.

FIG. 12B shows an alternative arrangement where a parity sector $P_B$ is calculated for four sectors, S1, S2, S3 and S4. Sectors S1, S2, S3 and S4 are written to a single page 205 of a memory block 207. Parity sector $P_B$ is written to another block 209. In this example, block 209 is a dedicated block that holds only parity sectors and not sectors of user data. Block 209 may hold parity sectors for pages in different blocks throughout the memory array. In one example, parity sectors may be written to a scratch pad block and later consolidated if necessary. A detailed description of a scratch pad block and its operation is contained in U.S. patent application Ser. No. 11/016,285, entitled "Scratch Pad Bock," filed on Dec. 16, 2004, which patent application is hereby incorporated by reference in its entirety.

One advantage of the embodiments of FIGS. 12A and 12B, where parity data is generated over sectors of a single page, is that it is relatively easy to calculate the parity group for this amount of data. The parity data may be obtained by XORing together all the sectors of the page simultaneously or by sequentially XORing sectors. If sectors are sequentially XORed, the cache memory may be used to record parity data and save it for the succeeding XOR operation. Another advantage is that the parity sector may be written at the same time as the corresponding user data so that there is no danger of the parity data being lost in a powerdown situation.

Figure 13A:
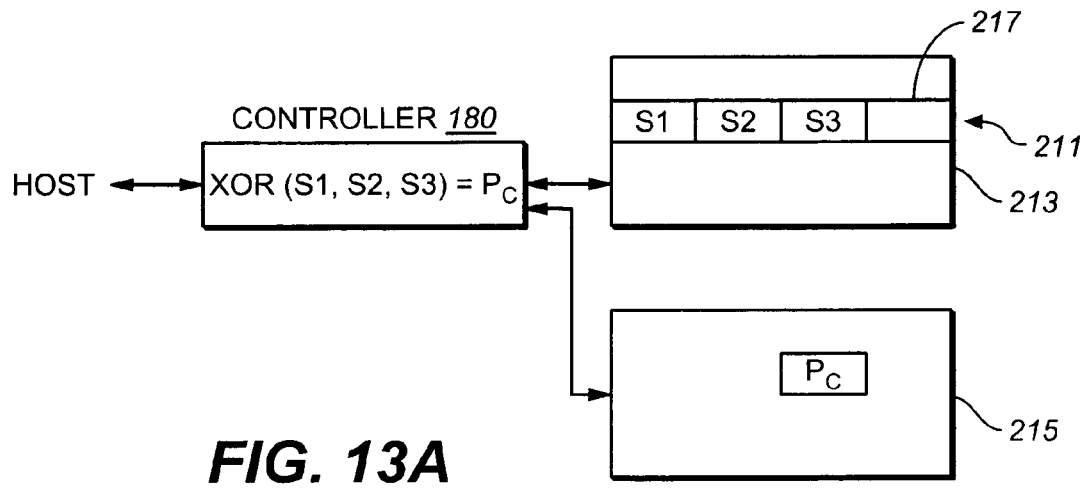
FIG. 13A shows an example of generation of a parity sector from data sectors that are written to partially fill a page.
Figure 13B:
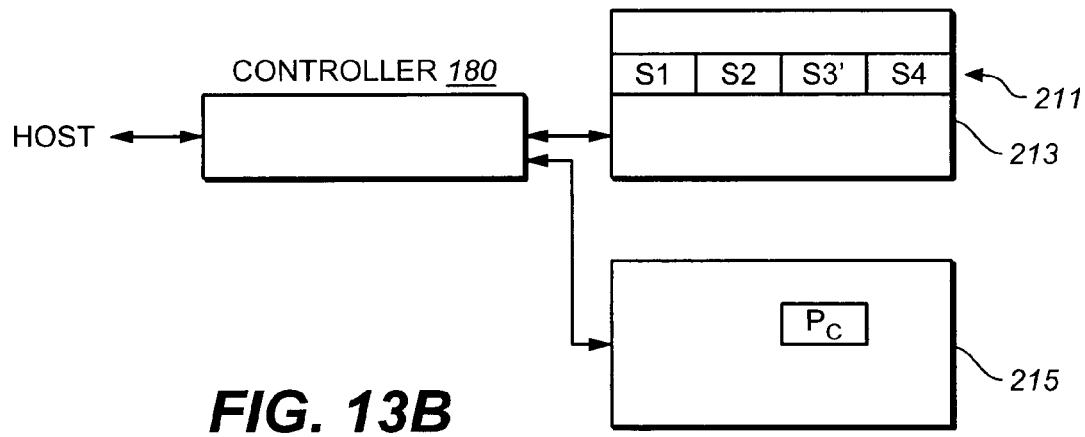
FIG. 13B shows subsequent writing of a sector to the partially full page of FIG. 13A that results in corruption of a previously written data sector.
Figure 13C:
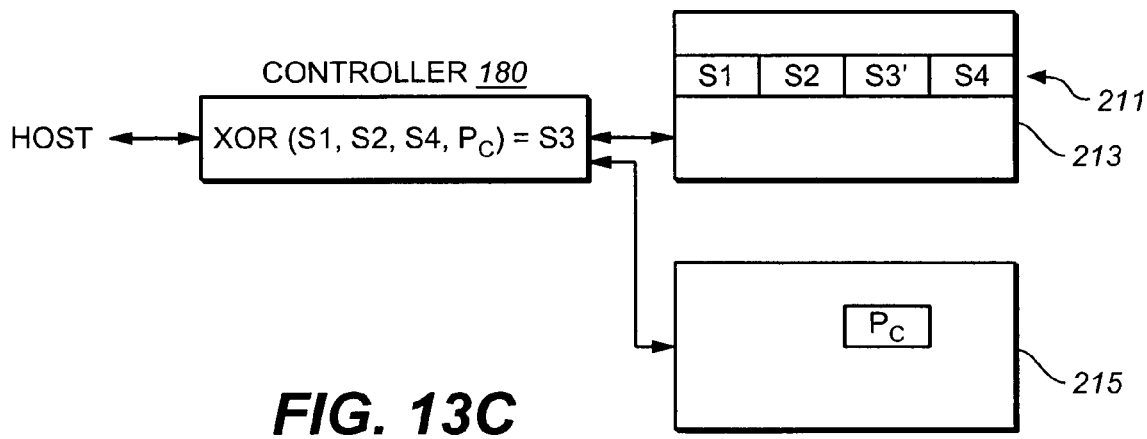
FIG. 13C shows subsequent correction of the corrupted data sector of FIG. 13B using the parity sector generated in FIG. 13A.

FIG. 13A shows generation of a parity sector $P_C$ from sectors S1, S2 and S3. Sectors S1, S2 and S3 are then stored in a page 211 of a first block 213 and $P_C$ is stored in a different block 215. Thus, S1, S3 and S3 occupy less than a full page of block 213. The remaining portion 217 of page 211 may remain unprogrammed during programming of S1, S2 and S3 by inhibiting programming of the corresponding cells. Bits of data corresponding to the unprogrammed cell state may be used as "padding" to ensure that these cells remain in the unprogrammed state. Generally, it has not been possible to later program such cells without corrupting the previously programmed data. Subsequent to storing S1, S2 and S3, sector S4 is received and is stored in page 211 with S1, S2 and S3 as shown in FIG. 13B. This may be achieved by inhibiting the programming of cells that already contain data while programming the new data. However, during such programming, stored data of sector S3 is disturbed as indicated by S3'. Thus, S3' corresponds to sector S3 with some data bits being corrupted. Later, this data may be read from the memory array in response to a host read command as shown in FIG. 13C. The sectors S1, S2, S3' and S4 are first subjected to an ECC algorithm. Any small errors in S1, S2 and S4 are identified and repaired at this stage. ECC establishes that S3' contains errors, but in this case, ECC is not able to repair the errors because too many bits have been changed. Because S3' contains errors that are not ECC-repairable, S3 is reconstructed from S1, S2, S4 and $P_C$. An XOR operation on these sectors provides S3 as it was originally stored. Sectors S1, S2, S3 and S4 are then sent to the host but the corrupted data S3' is not sent to the host.

Figure 14:
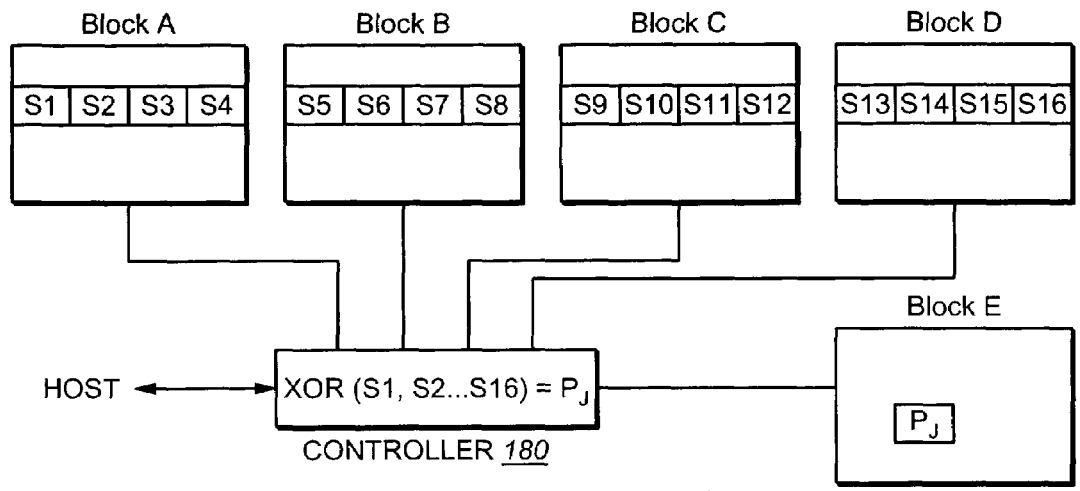
FIG. 14 shows an example of a parity sector generated from all the data sectors of a metapage, the parity sector stored outside the metapage.

FIG. 14 shows an example where data is stored in a memory array that has individual blocks of the memory array linked to form metablocks. Metablocks and systems using metablocks are described in detail in U.S. Pat. No. 6,763,424 and U.S. patent application Ser. No. 10/841,118, which documents are hereby incorporated by reference in their entirety. In this example, blocks A-D are programmed in parallel and are treated by the controller as if they were a single block. This high parallelism gives a high programming speed. Sectors S1-S16 of blocks A-D are programmed as if they were a single page and may be considered a metapage. A parity sector for such an example may be calculated for the sectors of a metapage. In FIG. 14, the parity sector $P_J$ is stored in a separate, dedicated block (block E), though this is not always so. In other examples, the parity sector may be stored in the same page as the related sectors. Blocks A-D may be formed on a single memory chip or may be on different chips that are connected together to form a multi-chip array.

Figure 15:
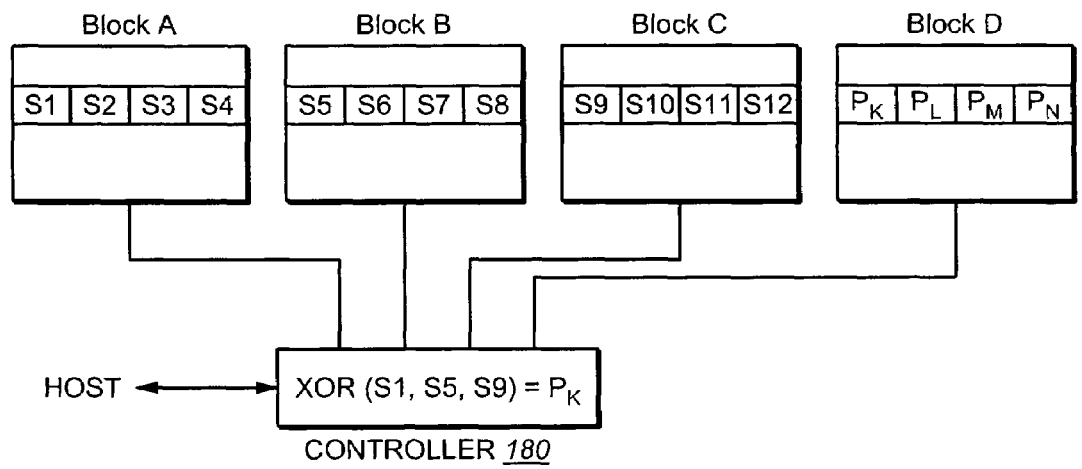
FIG. 15 shows an example of parity groups generated from sectors of a metapage with the parity groups stored in the same metapage as the data groups.

FIG. 15 shows another example of parity groups used with metablocks. Here, blocks A-D are linked together to form a metablock with all blocks A-D being written in parallel. Block D is dedicated to storing parity sectors. In this case, a page of parity data is generated from the pages of the other blocks. Each parity sector within the parity page corresponds to particular sectors of user data. For example, $P_K$ is derived from S1, S5 and S9, $P_L$ is derived from S2, S6 and S10 etc. In this system, any individual block A, B, C or D can fail without loss of data because all the data in the block can be reconstructed from the other blocks in the metablock.

Some memory chips have excess memory capacity that may be used to store parity group data. When memory chips undergo testing, some chips are identified as defective because part of the chip is inoperable. Such chips may still have a lot of operable storage capacity and may still be used. Because memory chips are rated as having a capacity that is given in particular discrete values (256 Megabyte, 512 Megabyte etc) such chips may be used as a chip of a lower size. For example, a 1 Gigabyte chip that is defective may still be operated successively as a 512 Megabyte chip by using half its capacity and not using the portion of the memory chip that contains defects. Though such chips use only half their nominal capacity, often more than half the nominal capacity is operable. In the example of a 1 Gigabyte chip operated as a 512 Megabyte chip, there may be anywhere between 512 Megabytes and 1 Gigabyte (really 1024 Megabytes) of usable capacity. Thus, excess usable capacity is available that may not be used by the host because the host only recognizes a capacity of 512 Megabytes. The remaining usable space may be used for storage of parity groups to ensure no data is lost without reducing the capacity for storage of user data.

The above examples give different options for providing parity groups for stored data. In general, more parity data will provide greater security in case of corruption of data. Thus, multidimensional striping provides a greater degree of security than one-dimensional striping. Providing a larger proportion of parity group data (smaller stripes, or larger parity groups) also provides a greater degree of security. Similarly, providing ECC data also increases the chances of being able to correct small errors. However, such measures add undesirable overhead by requiring additional time to apply the necessary algorithms to derive parity data and also requiring additional space in the memory array to store such data. Generally, an appropriate level of parity group use may be chosen for a particular memory architecture based on the probability of data corruption. The level of parity group use may be fixed during initialization or may be adjusted dynamically. For example, an older memory may suffer more errors and it may therefore be appropriate to increase the level of parity group use in such systems. Also, the level of parity group use may vary according to the importance of the data. Where the data is not critical, no parity group correction or ECC correction only may be needed. For data of intermediate importance, one-dimensional striping may be used to provide a parity group and ECC may also be employed. For more important data, multidimensional striping may be used to provide multiple parity groups and additional parity groups may be calculated for those parity groups. Parity group generation may be managed by the controller as determined by firmware running in the controller. Alternatively, a host may send a command regarding parity group generation. For example, a host may turn parity group generation "on" or "off" according to requirements. In other examples, parity group generation may be done without any host involvement and without any knowledge by the host.

The present invention is not limited to the particular examples described above. While the above examples generally refer to the XOR operator to generate parity groups, other operators may also be used. For example, summation may provide a similar parity group. The storage of user data is referred to in some examples. However, various data may be advantageously stored as described and the advantages are not limited to any particular type of data. Data used by the host to locate user data (such as FAT sectors) may be stored in this way as well as data generated by the controller. While certain hardware examples are given, aspects of the present invention may be practiced on any suitable hardware.

Although the various aspects of the present invention have been described with respect to certain preferred embodiments, it is understood that the invention is entitled to protection within the full scope of the appended claims.

The invention claimed is:

1. A method of generating parity bit groups, comprising:
    organizing data in a non-volatile memory system logically in a multidimensional data group array, the data group away having first data group rows in a first dimension and second data group rows in a second dimension that is orthogonal to the first dimension;
    generating first parity bit groups corresponding to the first data group rows;
    generating second parity bit groups corresponding to the second data group rows;
    the first parity bit groups, the second parity bit groups and data groups of the data group array each having an equal number of bits;
    associating logically the generated parity bit groups with the corresponding data group rows; and
    wherein the organized data correspond to firmware of the non-volatile memory system.

2. The method of claim 1, wherein the data comprise:
    items of data, represented by one of bits or bytes.

3. The method of claim 1, wherein generating first and second parity bit groups comprises:
    generating parity bits by performing logical operations on corresponding items of data of the data groups along the data group rows.

4. The method of claim 3, wherein the logical operations are at least one of summations and exclusive ors.

5. The method of claim 1, further comprising:
    generating a parity bit group of the first parity bit groups by performing logical operations on the corresponding parity bits of the first parity bit groups.

6. A method of managing corrupted data in a non-volatile memory array, the method comprising:
    organizing data in a non-volatile memory system logically in a data group array, the data group array having one or more data group rows;
    generating one or more parity bit groups, corresponding to the one or more data group rows a parity bit group having a number of bits equal to the number of bits in a data group;
    associating logically the one or more generated parity bit groups with the one or more corresponding data group rows;
    using an error correction code to identify a corrupted data group within the data group array; and
    using the one or more parity bit groups to reconstruct the corrupted data group by identifying a plurality of data group rows that contain the corrupted data group, the plurality of data group rows including at least an additional corrupted data group, and further identifying within the plurality of data group rows at least one data group row in which the corrupted data group is the only corrupted data group.

7. The method of claim 6, wherein using the error correction code comprises:
    computing and appending the error correction code to the data group as part of writing the data group to the non-volatile memory array;
    recomputing an error correction code of the data group as part of a reading of the data;
    comparing the stored error correction code of the data group with the recomputed error correction code of the data group; and
    identifying the data group as corrupted when the appended error correction code does not agree with the recomputed error correction code.

8. The method of claim 6, wherein the reconstructing of the corrupted data group comprises:
    reading in the parity bit group associated with a data group row when the data group row is identified in which the corrupted data group is the only corrupted data group.

9. The method of claim 8, wherein the reading of the parity group comprises:
    using an error correction code to detect whether the read parity group is corrupted.

10. The method of claim 9, wherein the reconstructing of the corrupted data group comprises:
    searching for a different data group row in which the corrupted data group is the only corrupted data group when the error correction code detects that the parity group of the identified data group row is corrupted.

11. The method of claim 10, wherein the correcting of the corrupted data group comprises:
    flagging the corrupted data group when the parity groups of every data group row, in which the corrupted data group is the only corrupted data group, are corrupted; and
    using an error correction code to identify a different corrupted data group.

12. The method of claim 8, wherein the reconstructing of the corrupted data group comprises:
    reconstructing of the items of data of the corrupted data group by performing logical operations on the corresponding items of data of the non-corrupted data groups of the identified data group row and the corresponding parity bits of the parity bit group of the identified data group row.

13. The method of claim 12, wherein the logical operations comprise at least one of summations and exclusive ors.

14. The method of claim 6, wherein the managing of the corrupted data groups comprises:
flagging a corrupted data group, when no data group row is found in which the corrupted data group is the only corrupted data group; and
using an error correction code to identify a different corrupted data group.

15. The method of claim 6 wherein the one or more data group rows include a first data group row that consists of a first number of data groups used to generate a first parity bit group and a second data group row that consists of a second number of data groups used to generate a second parity bit group, the first number and the second number not being equal.

16. The method of claim 6 wherein subsequent to the using an error correction code to identify a corrupted data group, correction of the data group by ECC is attempted and the correction using the one or more parity bit groups only occurs after correction of the data group by ECC is unsuccessful.

17. A method of correcting data that is read from a non-volatile memory away within a memory card that is removably connected to a host, comprising:
reading a data group from the non-volatile memory array;
applying an Error Correction Code (ECC) algorithm to the data group to detect errors and repair ECC-repairable errors in the data group; and
subsequently, if errors that are not ECC-repairable are detected in the data group, using one or more additional data groups and a parity group that is stored in the card to reconstruct data within the data group and substituting the reconstructed data for the data that contains errors.

18. The method of claim 17 wherein the parity group was previously stored in the non-volatile memory at a time of writing of the data group.

19. The method of claim 18 wherein the parity group was calculated by an Exclusive OR (XOR) operation on the data group and the one or more additional data groups.

20. The method of claim 17 wherein, if errors that are not ECC-repairable are detected, the locations of the errors are determined by the ECC algorithm and the locations are used to determine which data to reconstruct.

21. The method of claim 17 wherein the data group, the additional data groups and the parity bit groups are sectors of data.

22. The method of claim 21 wherein the data group and the additional data groups are stored in a page of the memory array.

23. The method of claim 17 wherein the data group and the additional data groups form a first row in a first direction, and the data group is also part of a second row in a second direction, the second direction being orthogonal to the first direction.

24. The method of claim 23 wherein the parity group was generated from the first row and a second parity group was generated from the second row, the parity group and the first row used to reconstruct data within the data group only when reconstruction of the data within the parity group using the second row and the second parity group is not successful.

25. A method of storing data in a non-volatile memory array that has a minimum unit of programming of a page, a page containing multiple addressable units of data, comprising:
deriving a parity group by performing a parity operation on a plurality of addressable units of data, the plurality of addressable units of data designated for storage in a page of the non-volatile memory, the parity group having the same size as an addressable unit of data;
storing the plurality of addressable units of data in the page; and
storing the parity group in the non-volatile memory array.

26. The method of claim 25 wherein the parity group is stored in the page with the plurality of addressable units of data.

27. The method of claim 25 wherein the parity group is stored in a portion of the non-volatile memory that is dedicated to storage of parity groups.

28. The method of claim 25 wherein the plurality of addressable units of data form less than a full page of data, further comprising:
storing the plurality of addressable units of data in the page with padding data bits;
subsequently replacing the padding data bits with additional data thereby corrupting one of the plurality of addressable units of data; and
subsequently recreating the one of the plurality of addressable units of data from the parity group and the other ones of the plurality of addressable units of data.

29. The method of claim 25 wherein the non-volatile memory array is in a removable memory card that is connected to a host and the plurality of addressable units of data are sent by the host to the memory card for storage.

* * * * *